United States Patent
Murray

(10) Patent No.: US 11,340,797 B2
(45) Date of Patent: May 24, 2022

(54) DEDICATED ENCRYPTED CONTAINER STORAGE

(71) Applicant: Zettaset, Inc., Los Altos, CA (US)

(72) Inventor: Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 18 days.

(21) Appl. No.: 16/844,275

(22) Filed: Apr. 9, 2020

(65) Prior Publication Data

US 2021/0103392 A1 Apr. 8, 2021

Related U.S. Application Data

(63) Continuation-in-part of application No. 16/796,001, filed on Feb. 20, 2020, which is a continuation-in-part (Continued)

(51) Int. Cl.
*G06F 21/60* (2013.01)
*H04L 9/06* (2006.01)
(Continued)

(52) U.S. Cl.
CPC ............ *G06F 3/0622* (2013.01); *G06F 3/067* (2013.01); *G06F 3/0631* (2013.01);
(Continued)

(58) Field of Classification Search
CPC ......... G06F 3/06–0689; G06F 12/0646; G06F 21/602; G06F 21/79; G06F 2212/1041;
(Continued)

(56) References Cited

U.S. PATENT DOCUMENTS

RE38,070 E    4/2003  Spies et al.
9,667,725 B1  5/2017  Khanduja et al.
(Continued)

FOREIGN PATENT DOCUMENTS

KR  10-2011-0053427 A   7/2008
KR  10-2019-1987668 B1  7/2018

OTHER PUBLICATIONS

Alves, Diogo Luis Barradas, "Implementation of a Private Cloud", Dissertation for Masters Degree, Universidade Nova de Lisboa, Sep. 1, 2016, pp. 1-60, Universidade Nova de Lisboa, Lisbon, Portugal.
(Continued)

*Primary Examiner* — Nicholas J Simonetti
(74) *Attorney, Agent, or Firm* — Asif Ghias

(57) ABSTRACT

Techniques are disclosed for dynamically allocating dedicated encrypted storage for containers/applications in a containerized environment. Only those container(s) are able to access an encrypted storage volume that have access to the volume secret for the volume. The volume secret is combined with a pre-key using a hash-based key derivation function (HKDF) to obtain the volume/encryption key for the volume. In various aspects, one is able to specify the amount of encrypted storage desired/required in a storage/host volume to be allocated to a container on-demand. The containerized application for which an instant dynamically allocated dedicated storage volume is created may be a composable multi-container or microservices application. The encrypted storage volume is optimally assembled from the partitions of the storage devices available on a host. The storage devices may be local to the host or remote or in the cloud.

21 Claims, 21 Drawing Sheets

Related U.S. Application Data of application No. 16/716,934, filed on Dec. 17, 2019, now Pat. No. 11,079,944.

(60) Provisional application No. 62/910,769, filed on Oct. 4, 2019.

(51) Int. Cl.

| | | |
|---|---|---|
| *G06F 12/06* | (2006.01) | |
| *G06F 21/79* | (2013.01) | |
| *G06F 3/06* | (2006.01) | |
| *G06F 21/78* | (2013.01) | |

(52) U.S. Cl.
CPC .......... *G06F 3/0644* (2013.01); *G06F 3/0689* (2013.01); *G06F 21/602* (2013.01); *G06F 21/78* (2013.01); *H04L 9/0631* (2013.01); *G06F 2221/0751* (2013.01)

(58) Field of Classification Search
CPC . G06F 21/78; G06F 2212/0751; H04L 9/0631
See application file for complete search history.

(56) References Cited

U.S. PATENT DOCUMENTS

| | | | |
|---|---|---|---|
| 9,740,436 B2 | 8/2017 | Fiebrich-Kandler et al. | |
| 9,864,874 B1* | 1/2018 | Shanbhag | H04L 9/088 |
| 10,255,135 B2* | 4/2019 | Resch | G06F 3/0604 |
| 10,372,926 B1* | 8/2019 | Leshinsky | H04L 9/0894 |
| 2002/0049825 A1* | 4/2002 | Jewett | H04L 69/329 |
| | | | 709/215 |
| 2009/0198791 A1* | 8/2009 | Menghnani | G06F 3/0608 |
| | | | 709/215 |
| 2010/0228990 A1* | 9/2010 | Billings | G06F 21/78 |
| | | | 713/185 |
| 2011/0314534 A1 | 12/2011 | James | |
| 2012/0089806 A1* | 4/2012 | Yoshioka | G06F 12/0292 |
| | | | 711/173 |
| 2012/0297206 A1* | 11/2012 | Nord | G06F 21/78 |
| | | | 713/193 |
| 2013/0054946 A1* | 2/2013 | Thom | G06F 21/73 |
| | | | 713/2 |
| 2013/0067242 A1 | 3/2013 | Lyakhovitskiy et al. | |
| 2013/0111221 A1* | 5/2013 | Fujii | G06F 21/78 |
| | | | 713/193 |
| 2013/0204849 A1* | 8/2013 | Chacko | G06F 3/0641 |
| | | | 707/692 |
| 2014/0053150 A1 | 2/2014 | Barnett et al. | |
| 2014/0109086 A1 | 4/2014 | Mizrahi et al. | |
| 2014/0245016 A1 | 8/2014 | Desai et al. | |
| 2015/0033224 A1 | 1/2015 | Maheshwari et al. | |
| 2015/0128105 A1 | 5/2015 | Sethi et al. | |
| 2015/0277897 A1* | 10/2015 | Deng | H04W 8/245 |
| | | | 717/169 |
| 2016/0378353 A1* | 12/2016 | Schmisseur | G06F 3/0685 |
| | | | 711/114 |
| 2017/0083532 A1 | 3/2017 | Kottomtharayil et al. | |
| 2017/0102960 A1* | 4/2017 | Dwarampudi | G06F 3/0619 |
| 2017/0302589 A1 | 10/2017 | Leafe et al. | |
| 2018/0032446 A1 | 2/2018 | Amarendran et al. | |
| 2018/0095872 A1 | 4/2018 | Dreier et al. | |
| 2018/0107834 A1 | 4/2018 | Erofeev et al. | |
| 2018/0300075 A1 | 10/2018 | Fernandez et al. | |
| 2019/0251279 A1 | 8/2019 | Emberson et al. | |
| 2019/0278506 A1 | 9/2019 | Richardson | |
| 2019/0286373 A1 | 9/2019 | Karumbunathan et al. | |
| 2020/0145186 A1* | 5/2020 | Candelore | G06F 21/16 |

OTHER PUBLICATIONS

Cheng Yue, "Workload—aware Efficient Storage Systems", Dissertation for PhD in Computer Science and Applications, Jun. 22, 2017, pp. 1-134, Virginia Polytechnic Institute and State University, Blacksburg, VA, USA.

Faria, De M. Heitor, A Backup-as-a-Service (BaaS) Software Solution, Disseration for Professional Master in Applied Computing, Department of Computer Science, University of Brazil, Jul. 1, 2018, pp. 1-73, University of Brazil, Brasilia, Brazil.

Portworx, "Encrypted volumes using pxctl", Portworx, Sep. 20, 2019, https://docs.portworx.com/reference/cli/encrypted-volumes/#encrypted-volumes, Los Altos, CA, USA.

Shariffdeen, Ridwan et al., "inteliScaler—Workload and Resource Aware, Proactive Autoscaler for PaaS Cloud Frameworks", Report for the partial fulfillment of Bachelor of Science Degree, University of Moratuwa, Feb. 21, 2016, pp. 1-91, University of Moratuwa, Sri Lanka.

Tihfon, Gemoh Maliva et al., "An efficient multi-task PaaS cloud infrastructure based on docker and AWS ECS for application deployment", Cluster Computing, Jul. 23, 2016, pp. 1585-1597, vol. 19(3), Springer Science+Business Media, New York, USA.

Yousafzai, Abdullah et al., "Cloud resource allocation schemes: review, taxonomy, and opportunities", Knowledge Information Systems, May 12, 2016, pp. 347-381, vol. 50(2), Springer-Verlag, London, United Kingdom.

* cited by examiner

```
[docker@localhost ~]$
[docker@localhost ~]$ docker volume create -d ztsvolume --name zts-test-vol --opt size=500mb
zts-test-vol
[docker@localhost ~]$
[docker@localhost ~]$
[docker@localhost ~]$ docker volume ls
DRIVER      VOLUME NAME
local       03a571275e7870a4254dfa2158a6130549ed6263b1342dd20191a21a62bdaaa47
local       223dc47a64775d04b010e63ee6bddc513909958f2ff4a741ff593c62c13b12c
local       615af46e2f39a139500354e933a870b55ba80c52a41c46d67d32ff9bda33e0c56
local       6bbab053255c6b34c978a5df87e28f4db44c72154fdcd9784553208c50a0de343
local       856b4e909a19725fc5d8167208b7d62953fd0daba493f65806ad2cf19c57344
local       87e49da4ae6f7d53f567e55b63ab775bd6b804037e4c3db378f87ec0a7d9ab36e
local       b6a8f145b1e7fe1b0f10616f1a43ef74d4327edfffbe052f9de37217f03c573f
local       b9039f0635d0b9a0744ee20000769c0128f7cce5a3ef6885cd0cfd72b5126110
local       da470b534d53032eb056f5d0d0d9161af83e07336c356b0172fbfd5aec2e20
local       da735e0984538267aa5c7b26ac6909962f9cfd26d94df375adb0ad777aa04562a
local       fd91137c6906c14010666e09ebd00138378d3d273d91e792263d33de66f08c5f
ztsvolume   zts-test-vol
```

DEDICATED ENCRYPTED CONTAINER STORAGE

RELATED APPLICATIONS

This application claims priority from U.S. Provisional Patent Application No. 62/910,697 filed on 4 Oct. 2019 and which is incorporated herein by reference for all purposes in its entirety. This application is also a continuation-in-part of U.S. patent application Ser. No. 16/796,001 filed on Feb. 20, 2020 which is a continuation-in-part of U.S. application Ser. No. 16/716,934 filed on 17 Dec. 2019 and also claims priority from U.S. Provisional Patent Application No. 62/910,769 filed on 4 Oct. 2019. U.S. application Ser. No. 16/716,934 claims priority from U.S. Provisional Patent Application No. 62/910,769 filed on 4 Oct. 2019. All the above numbered applications are incorporated by reference for all purposes in their entireties.

FIELD OF THE INVENTION

This invention generally relates to encrypted persistent storage for containers and micro services.

BACKGROUND ART

Storage allocation continues to be an important aspect of computing architecture and design. It is especially important in containerized environments where containers are spawned dynamically for running applications and services. While there are many techniques that address the issue of storage allocation for containers and their applications, these techniques rely on static allocation of storage.

For allocating storage via storage volumes, the prevailing techniques do not give control to a container/application over specifying the amount of storage needed. In other words, while making a request to allocate a storage volume to a container/application, the operator/user is unable to specify the amount of storage desired or required in the storage volume. Thus, there is no ability for the prevailing techniques to dynamically or elastically assemble storage volumes on-demand of a required/desired size and then assign it to the container.

In prior art, U.S. Pat. No. 9,740,436 B2 to Fiebrich-Kandler et al. discloses a mechanism of data processing system for elastic data storage management in a storage network. A data storage system manager in the data processing system monitors remaining free space of a plurality of data storage systems. The data storage system manager determines a rate of change of remaining free space of each data storage system. Responsive to determining that the remaining free space or rate of change of remaining free space of at least one data storage exceeds a threshold, the data storage system manager determines an amount to expand or shrink a given data storage system in the storage network. The data storage system manager configures data storage allocation to expand or shrink the given data storage system by the determined amount.

U.S. Patent Publication No. 2019/0286373 A1 to Karumbunathan et al. teaches servicing I/O operations in a cloud-based storage system. These operations include receiving, by the cloud-based storage system, a request to write data to the cloud-based storage system and storing the data in solid-state storage of the cloud-based storage system. They also include storing the data in object storage of the cloud-based storage system, and detecting that at least some portion of the solid-state storage of the cloud-based storage system has become unavailable. They also include identifying data that was stored in the portion of the solid-state storage of the cloud-based storage system that has become unavailable. The I/O operations also include retrieving from object storage the data that was stored in the portion of the solid-state storage that has become unavailable and storing the retrieved data in solid-state storage of the cloud-based storage system.

U.S. Patent Publication No. US 2017/0302589 A1 to Leafe et al. teaches providing a plugin interface for a cloud computing system. The publication discloses plugin interfaces for a compute service, object service, network service, authentication and authorization service, message service, and image service. One or more of the plugin interfaces can be used to alter the allocation of virtual to physical resources across multiple services. The reference further teaches that compound services and smart allocation facilities are possible with user-directed modification.

Ph. D. dissertation of Ali R. Butt et al. of Virginia Polytechnique Institute entitled "Workload-aware Efficient Storage Systems", dated Jun. 22, 2017 discusses a workload-aware storage management model. They propose a design and data management and storage systems by applying a simple yet effective rule-workload awareness. They find that simple workload-aware data management strategies are effective in improving the efficiency of modern storage systems, sometimes by an order of magnitude. Their work tackles the data management and storage space allocation issues at distributed and cloud storage level. It also focuses on low-level data management problems in the local storage system, which many high-level storage/data-intensive applications rely on.

FIG. 1 shows a typical containerized environment 10 of prior art. Containerized environment 10 has a host system 12 comprising a hardware or an infrastructure layer 14 and an operating system (OS) layer 16 running on infrastructure/hardware 14. Also shown in FIG. 1 is a container engine 18 executing containers 1, 2, 3, 4, 5, . . . represented by reference numerals 20, 22, 24, 26, 28, . . . . Container engine 18 is a component of the containerization software/solution/suite necessary to support containerized environment 10. In particular, container engine 18 is responsible for managing the lifecycles of containers 20, 22, . . . . Exemplary containerization solutions available in the art include Docker™, Red Hat OpenShift™, rkt, etc.

Also shown in FIG. 1, is a file storage mechanism 30 comprising various storage devices or disks as shown. In such a typical prior art system 10 as shown, when container 1 needs storage space, it makes a request to container engine 18 for either creating a new volume or mounting an existing one. The request contains the filesystem path on storage 30 where the volume will be created or is already located. The size of available storage on the path is predetermined and container 1 has no control over it. In other words, container 1 cannot specify the size of the space required in the volume in the above request to container engine 18.

The determination of the amount storage space that is sufficient must be made by container 1 beforehand. If the required storage space is large, the user of container 1 typically contacts an administrator 40 of environment 10 in advance to ensure that sufficient space is available on a given filesystem path in storage 30. As a result, administrator 40 then typically determines the amount of available storage on various storage devices in storage 30.

If needed, admin 40 would install additional hard drives in storage 30 and/or "combine" physical volumes into a new volume group or extend an existing volume group. He/she would then create a logical volume over the volume group of the size requested by the above user and then subsequently create a filesystem of the required type on it. This volume will have a volume id and a path in storage 30. Admin 40 would then manually notify the above user that sufficient space on the above path is now available in storage 30. Based on this information, the operator/user of container 1 can now create a storage volume on this path or change the mountpoint of an existing volume to this path if needed for container 1.

Needless to say, the above process is almost entirely manual between the user/container 1 and admin 40. It is thus tedious and prone to errors and inefficiencies. As will be taught by this specification and drawing figures, the instant design of dynamic/elastic storage for containers automates the above process and dynamically allocates storage to containers 1, 2, . . . as needed.

In addition to dynamic allocation of container storage, encryption of the data stored is also an important aspect of computing architecture and design. It is especially important in the above-discussed containerized environment where containers are spawned dynamically for running applications and services. While there are techniques that provide encrypted storage for containers in a containerized environment, these techniques do not dedicate the encrypted storage to one container or a predefined set of containers. As a result, the security of data-at-rest in such containerized environments is low because all containers can access and share an encrypted volume. Thus, for allocating storage via encrypted storage volumes, the prevailing techniques do not dedicate an encrypted storage volume to a container or containers.

In as far as related prior art is concerned, U.S. Patent Publication No. US 2018/0107834 A1 to Erofeev et al. teaches a method for automatically encrypting files. In some cases, the method may be performed by a computer and can include detecting access to a first file, which may be stored in a primary storage system. Further, the method can include determining whether the access comprises a write access. In response to determining that the access comprises a write access, the method can include accessing file metadata associated with the first file and accessing a set of encryption rules. In addition, the method can include determining whether the file metadata satisfies the set of encryption rules. In response to determining that the file metadata satisfies the set of encryption rules, the method can include encrypting the first file to obtain a first encrypted file and modifying an extension of the first encrypted file to include an encryption extension.

U.S. Pat. No. RE38,070E to Spies et al. discloses a cryptography system architecture to support an application requiring encryption, decryption, signing, and verification of electronic messages. The cryptography system has a cryptographic application program interface (CAPI) which interfaces with the application to receive requests for cryptographic functions. The cryptographic system further includes at least one cryptography service provider (CSP) that is independent from, but dynamically accessible by the CAPI. The CSP provides the cryptographic functionality and manages the secret cryptographic keys. In particular, the CSP prevents exposure of the encryption keys in a non-encrypted form to the CAPI or the application. The cryptographic system also has a private application program interface (PAPI) to provide direct access between the CSP and the user. The PAPI enables the user to confirm or reject certain requested cryptographic functions, such as digitally signing the messages or exportation of keys.

Referring back to the containerized environment of the above discussion and FIG. 1, using the techniques of the prior art, it is not possible to prevent multiple containers, such as containers 1, 2, 3, 4, 5 shown by reference numerals 20, 22, 24, and 28 respectively from being able to share the same encrypted host volume. The prior art thus does not provide a dedicated encrypted container storage for a single container/application or a given set of containers, that can only be decrypted by that container or the set of containers. In such a secure encrypted container storage environment absent in the prior art, containers that are not the intended user/recipient of the encrypted data will not have access to the decryption keys to decrypt the data stored in the encrypted storage.

For instance, in such a system unavailable in the prior art, a predefined set of containers, such as containers 1, 2 and 4 used by a given container application will be able to access an encrypted container storage volume, without containers 3 and 5 being able to access that volume. While there are prevailing key management interoperability protocol (KMIP)-based key managers that authenticate and issue keys on a per-host basis but however, not on a per-container basis. A typical prior art solution, Portworx allows creating encrypted host volumes for containers but lacks dynamic volume management of the present design as well as proper key management infrastructure to make the solution complete and secure.

OBJECTS OF THE INVENTION

In view of the shortcomings of the prior art, it is an object of the invention to provide a dynamic or elastic encrypted storage mechanism for containers and their applications. The dynamic encrypted storage mechanism would allow one to specify the amount of encrypted storage that is required for the container/application on-demand.

It is also an object of the invention to assemble an encrypted storage or encrypted host volume of a given size from the partitions of all storage devices available at the host.

It is also an object of the invention to assemble the required encrypted storage volume in an optimal manner.

It is yet another object of the invention to provide the above dynamic encrypted storage capabilities on storage devices that may be local to the host or remote.

It is also an object of the invention to provide the encrypted storage volume to a container or containers on a dedicated basis. As a result, only those container(s) would be able to access the encrypted volume that have the proper authorization or volume secret for the volume.

Still other objects and advantages of the invention will become apparent upon reading the summary and the detailed description in conjunction with the drawing figures.

SUMMARY OF THE INVENTION

A number of objects and advantages of the invention are achieved by apparatus and methods designed for providing dynamic or elastic encrypted storage system/mechanism or simply dynamic/elastic encrypted storage in a containerized environment. Various embodiments of such a containerized environment based on instant principles, may be implemented on a commercially available infrastructure-as-a-service (IaaS) without necessarily using local hardware/equipment.

A container is a lightweight virtualization mechanism that leverages the operating system and hardware of the host machine and creates a contained environment in which one or more processes execute. The container behaves as if it had its own hardware and operating system. A container engine executing on the host machine is responsible for managing the lifecycle of containers on the host. Persistent storage in a containerized environment is provided via storage volumes.

According to the chief aspects, the container engine issues a create volume request for creating an encrypted storage volume of a required size. Such a request may originate from a container or application that sends the request to the container engine, or it may be made by an operator/user via an interface connecting to the container engine. Further, there is also a separate storage configuration manager (SCM) module of the dynamic container storage of the present design. SCM, running on the host, is responsible for provisioning and partitioning of storage devices for instant dynamic storage.

The container engine passes the above create volume request to an encrypted container storage integration service (ECSIS) or driver operating/integrated with the container engine. The ECSIS in turn passes the request to a dynamic encrypted volume manager (DEVM) of the present technology. The DEVM interfaces with a storage allocation module (SAM) and requests a volume of the required size of the original create volume request. For this purpose, SAM first creates a global lock file and then reads the first partition of each storage device provisioned on the host. As noted above, instant SCM is responsible for partitioning of the storage devices.

The first partition, also referred to as the "dm" partition, contains the storage allocation persistence (SAP) information of the device. In the preferred embodiment, SAM reads in the SAP information and creates an allocation information structure (AIS) in memory. The SAP information and in-memory AIS that it is built from, contains the partition ids of the partitions on the device and a flag indicating whether or not that partition is available or unallocated. The in-memory nature of AIS provides for high performance of the technology according to the present principles.

SAM then creates or assembles an optimal list of unused/unallocated partitions of all the storage devices connected and provisioned on the host, such that the total size of the partitions on the optimal list meets or just exceeds the required encrypted volume size. It then passes this optimal list of partitions, and more specifically partition ids, to the DEVM. DEVM then creates a logical volume over these partitions with an associated volume id. In a highly preferred embodiment, SAM allocates the largest available partitions of the storage devices first, in a "greedy" fashion while creating the above optimal list. It then modifies this greedy allocation by removing excess storage from the optimal list. In another preferred embodiment, DEVM first creates a volume group on the partitions and then a logical volume over the volume group.

DEVM now interfaces with a key management infrastructure (KMI) to request creation of and subsequently obtain an encryption key. It then associates this encryption key to the volume id of the new dynamically created logical volume. SAM now updates SAP information to mark those partitions that are in the above logical volume as used/unavailable. More specifically, it updates its in-memory AIS first. It then writes the SAP information in the first partitions of the affected storage devices and removes the global lock file. At this point, DEVM passes the volume id of the optimally and dynamically created new volume and the associated encryption key to ECSIS.

ECSIS according to the present design contains an encrypt-decrypt kernel module that is responsible for trapping all read/write operations on the new volume. While servicing the read/write operations/calls, the encrypt-decrypt kernel module transparently decrypts/encrypts the data being read/written from/to the new volume. For this encryption/decryption, the read-write kernel module of ECSIS uses the encryption key or volume key associated with the volume id that was passed to it by DEVM per above. In this manner, the data-at-rest stored on the new dynamically created volume is transparently encrypted and conversely decrypted. Finally, ECSIS passes on the volume id of the new dynamically created and transparently encrypted container storage/host volume to the container engine to fulfill the above create volume request.

In the preferred embodiment, the encrypt-decrypt kernel module and the KMI implement symmetric encryption to gain maximum performance. In alternative embodiments, asymmetric encryption such as that based on public key infrastructure (PKI) may also be used to achieve maximum security. In the embodiments utilizing symmetric encryption, preferably the advanced encryption standard (AES) AES-256 bits XTS-XEX-based tweaked-codebook mode with ciphertext stealing (IEEE Std 1619-2007) block-cipher standard is used for ciphering. Alternatively, other appropriate encryption standards may also be used within the present scope.

The operation/process for decommissioning or deleting an encrypted storage volume previously created by the above dynamic encrypted container storage system proceeds in a converse manner. Specifically, a delete volume request is originated, such as by entering a command on the interface of the container engine. The request contains the volume id of the encrypted storage volume to be deleted. The container engine passes this request to ECSIS which passes it to SAM along with the volume id.

SAM creates a global lock file and then reads the dm partitions of each partition in the volume. Preferably it reads this information into an in-memory AIS. SAM also creates a list of the partitions in the encrypted volume to be deleted and passes this list to DEVM. DEVM then deletes the volume and preferably also any underlying volume group of the partitions in the list. SAM now marks those partitions in AIS as available/unused and writes SAP in the dm partitions of the affected devices and then deletes the global lock file.

In the preferred embodiment, the container environment above is a Docker™ or docker container environment and ECSIS above is implemented as a docker volume driver. In alternate embodiments, ECSIS is implemented using Kubernetes™ container storage interface or CSI. The storage devices may advantageously be provided locally on the host machine. Preferably, they are on a storage area network (SAN) and/or are network attached storage (NAS) devices. They may include redundant array of independent disks (RAID) devices. Preferably still, the storage devices are remote storage devices, including cloud storage, such as Amazon Web Services (AWS™) or Microsoft Azure™ storage, Google Cloud storage, etc.

In embodiments based on a docker implementation, the create volume request is preferably generated as a result of a modified "docker run" command and more specifically a "docker run -v" command. In other variations of docker implementation, the create volume request is preferably generated as a result of a modified "docker volume create" command. In such a modified command based on the present techniques, the required storage size for the encrypted volume required for the container is also specified on-demand. Preferably, it is a composable multi-container application that persists data on the encrypted storage volume created by dynamic/elastic encrypted container storage above. Such an application may be a "microservices" application known in the art and running on containers.

It should also be noted that dynamic encrypted container storage technology described above and in the rest of this specification, may also be used to optimally and dynamically allocate non-encrypted or plaintext container storage volume(s). In other words, the create volume request above may have a parameter/flag indicating whether the specified container storage of the required size needs to be encrypted or not. If the request is for non-encrypted container storage, then encryption related aspects described in the present design are not practiced/executed.

More specifically, for non-encrypted storage, DEVM does not obtain an encryption key from KMI. Therefore, it just passes the volume id of the new dynamically allocated container storage or logical volume to ECSIS. Consequently, ECSIS/driver does not need or deploys an encrypt-decrypt kernel module for trapping and servicing read/write calls on the non-encrypted storage volume by encryption/decryption.

In a set of highly preferred embodiments, the DEVM does not directly obtain the volume key from KMI but rather first obtains a "pre-key" from the KMI. It then combines the pre-key with a volume secret that was passed down along with the create volume request to derive the ultimate volume/encryption key. The derivation is preferably based on a hash-based key derivation function (HKDF). Then DEVM passes the volume key to ECSIS/driver that deploys it in encrypt-decrypt kernel module per above.

In the present embodiments, when a container/application needs to mount a dynamically allocated encrypted volume of the above design, it passes the volume id and the volume secret to DEVM. DEVM then queries the KMI with the volume id, which then provides it a pre-key. DEVM then derives the ultimate volume key or encryption key for the volume from the pre-key and the volume secret using the HKDF. It then passes the volume id and the volume key to ECSIS which then marks the volume for encryption/decryption with the volume/encryption key by deploying its encrypt-decrypt kernel module. Finally, ECSIS mounts the volume and notifies the container engine that it has satisfied the mount volume request.

In some variations, DEVM and ECSIS may be implemented as a single module. Preferably, the HKDF above is based on the NIST SP800-56C standard, or some other suitable KDF standard/scheme available in the art. In other variations, the actual or ultimate volume/encryption key may be wrapped by the encryption key obtained above. In other words, the encryption key derived by DEVM using the HKDF above is used to encrypt/decrypt the ultimate volume key that is used for encryption/decryption of the volume. In such a scenario, the mount volume request above is satisfied once the encryption key obtained from the HKDF is used to decrypt the ultimate volume key, and which is then passed to ECSIS to deploy in its encrypt-decrypt kernel module.

Preferably, the volume secret is implemented as a Docker™ Secret. Such an implementation allows multiple containers to share the volume secret and consequently the volume as needed. Alternatively, the volume secret is stored in a Secrets Storage that may be a dedicated key server. Such a key server may be separate from the KMI discussed herein. In other advantageous embodiments, the volume secret is stored in the filesystem of the container or containers requesting to create or mount the encrypted volume. What this means is that the volume secret is a part of the container image that is used to instantiate the container(s). Consequently, if multiple containers are instantiated from the same container image, then they all have access to the volume secret and therefore can share the same encrypted volume. In variations where the present technology is implemented in a Docker™ environment and where Kubernetes™ is the container management layer, the volume secret is implemented as a Kubernetes secret. In such variations, the secret is preferably stored in the ConfigMap of Kubernetes.

As a result of the innovative design of the present embodiments, only those containers that have the volume secret are able to access the encrypted storage volume. As such, we may refer to these embodiments as "dedicated" encrypted container storage based on the present technology. This is because the encrypted storage volume is dedicated to the container or containers having access to the volume secret. The container(s) having access to the volume secret are thus the container(s) "authorized" to use or are the intended recipient of the encrypted volume. Of course, a container/containers can have access to more than encrypted storage volume, in which case, the container(s) must have access to the volume secret of each encrypted storage volume. Per above, DEVM then combines the volume secret of each volume with the pre-key for the volume obtained from the KMI using the HKDF to derive the volume key for each volume.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

Figure 8A:
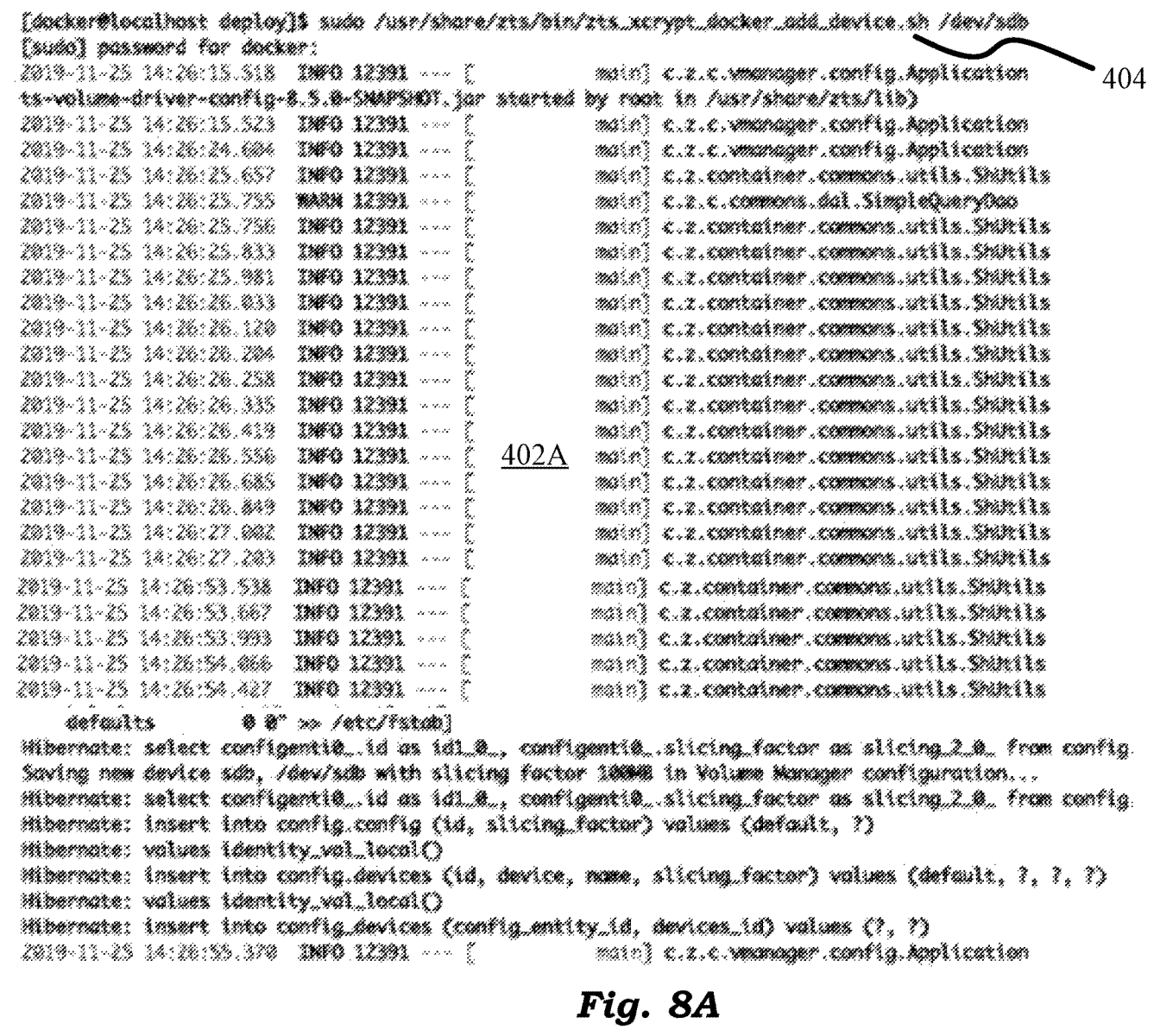
Figure 8B:
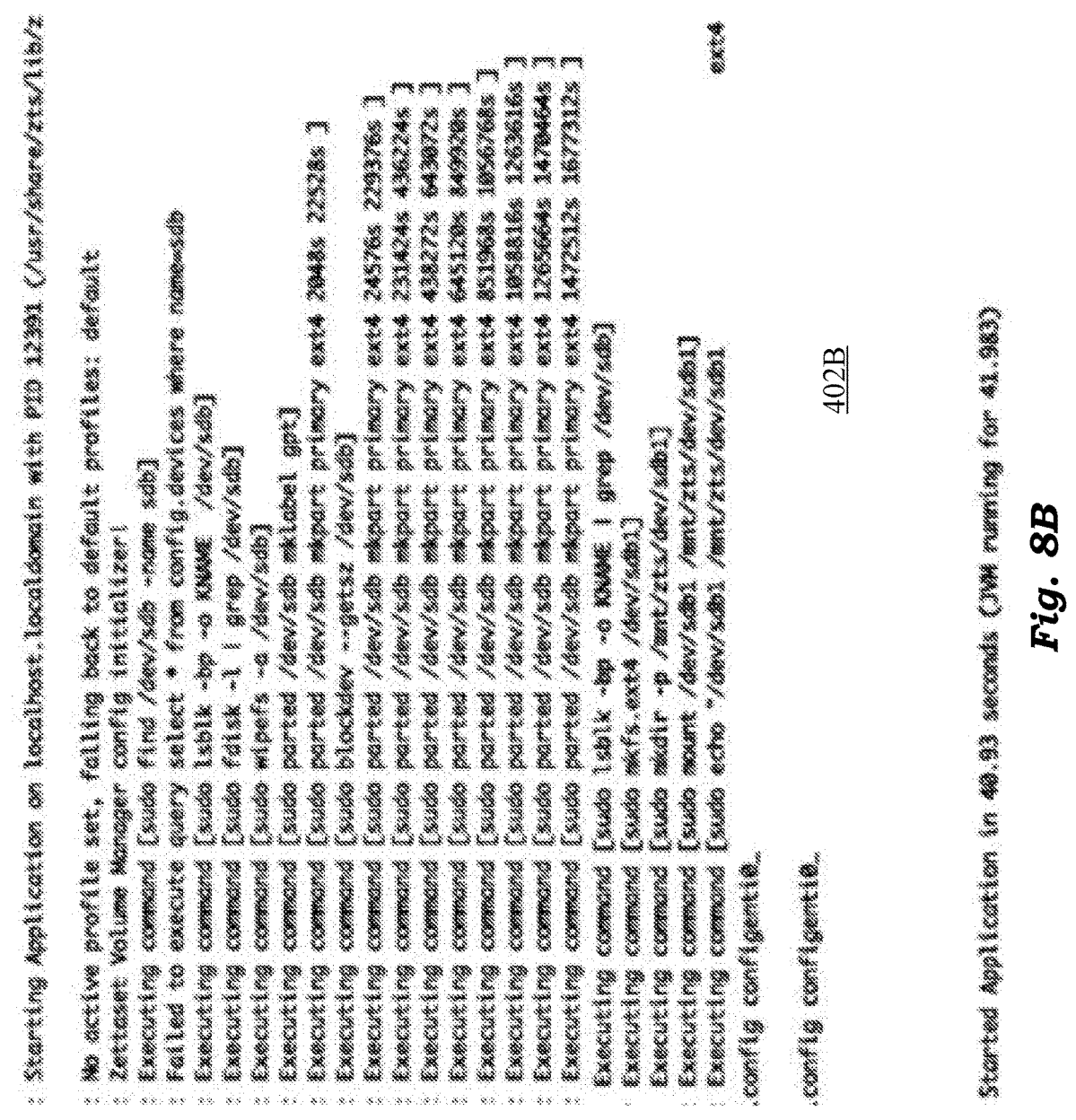

FIG. 8A-B present a single screenshot split into left and right sections from an exemplary implementation of the present design in a Linux environment running Docker™ software.

FIG. 9 presents a screenshot showing a modified docker volume create command being used to create a storage volume based on the present design.

Figure 10:
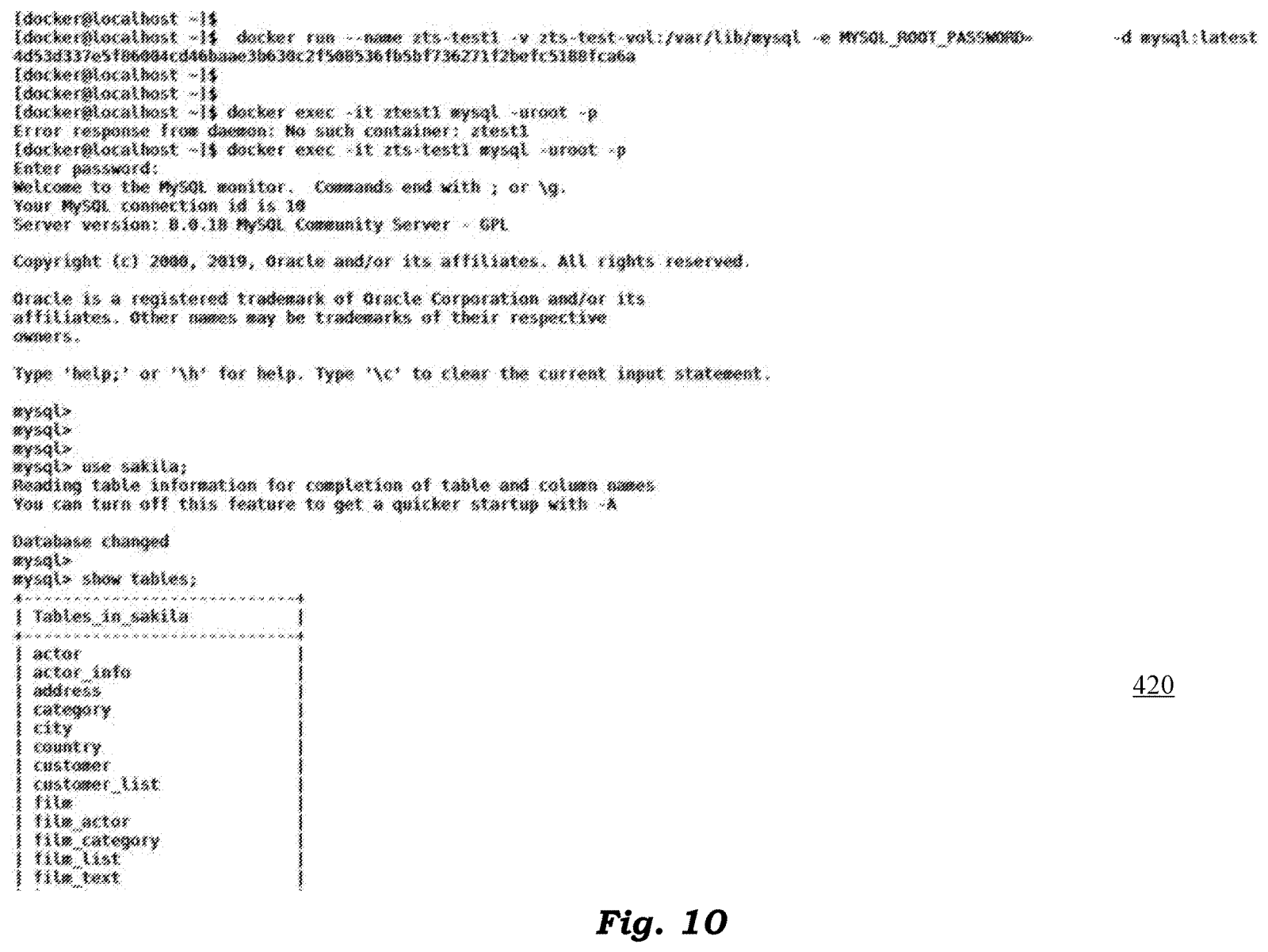

FIG. 10 presents a screenshot showing the creation of a docker container running a MySQL database with the storage volume created in screenshot of FIG. 9 above.

Figure 2:
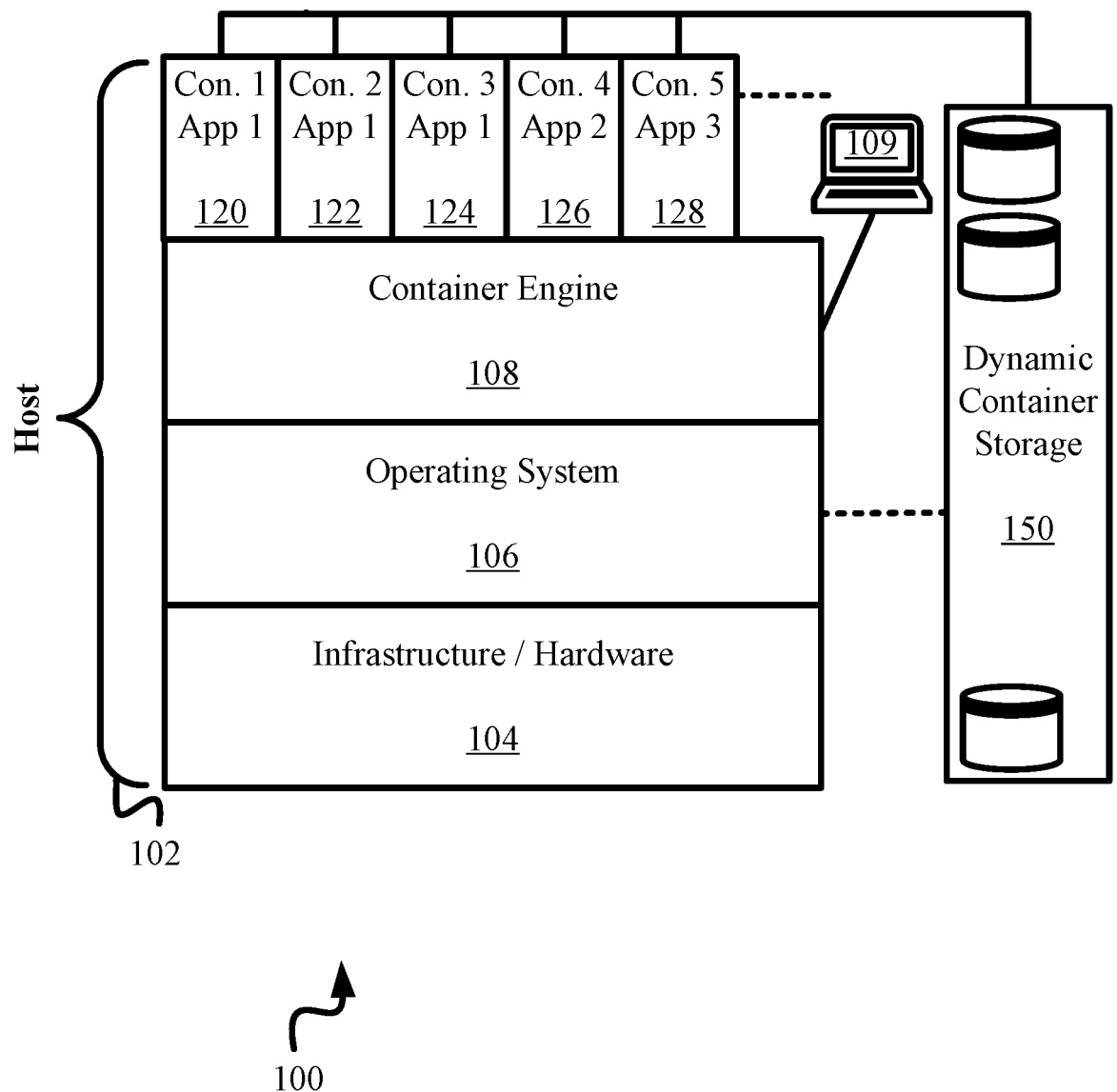
FIG. 2 is a block-level diagram of an improved containerized environment including a dynamic/elastic container storage of the present design.
Figure 11:
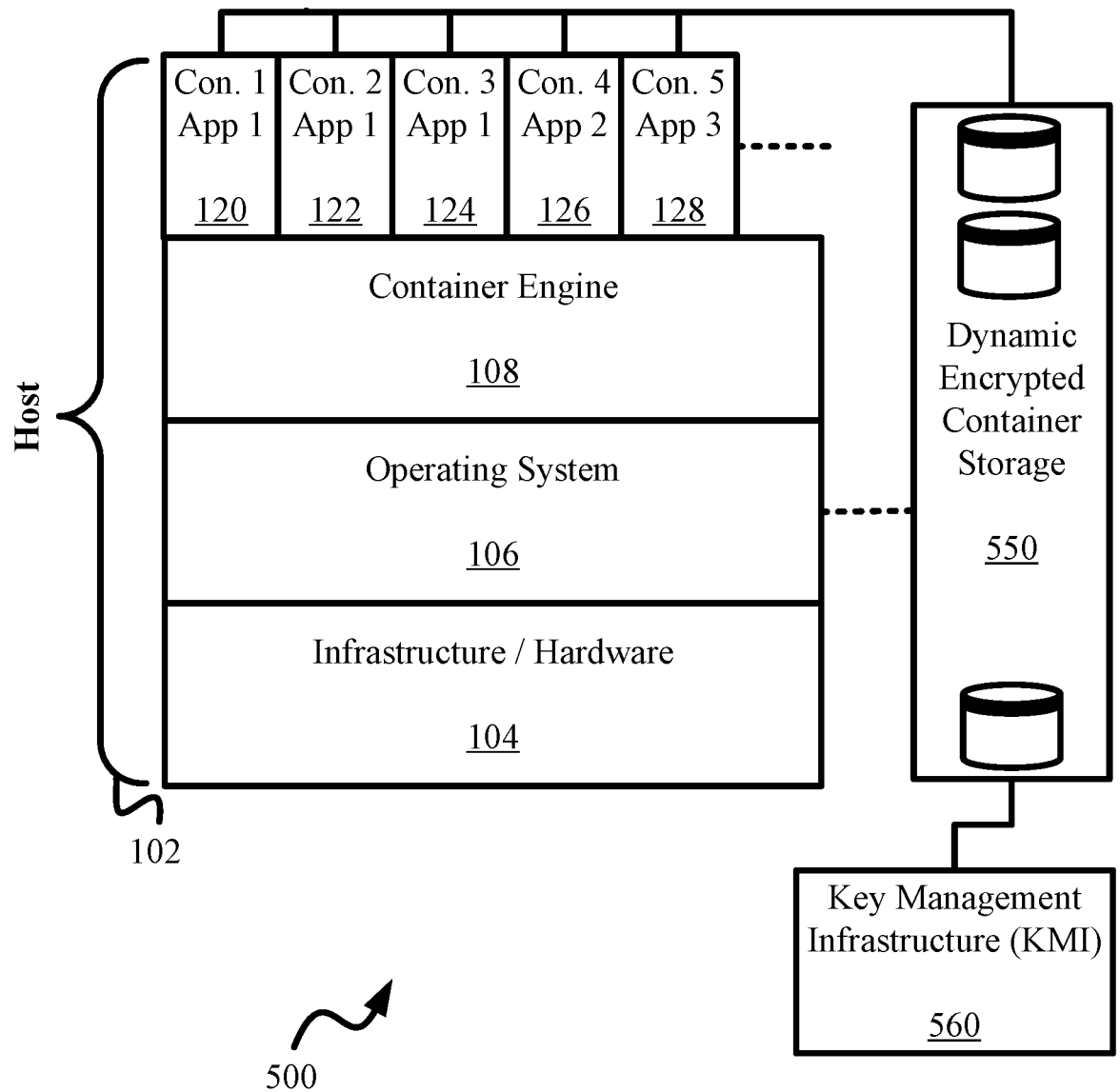

FIG. 11 is a variation of FIG. 2 showing a dynamic encrypted container storage and a key management infrastructure of the present design.

Figure 3:
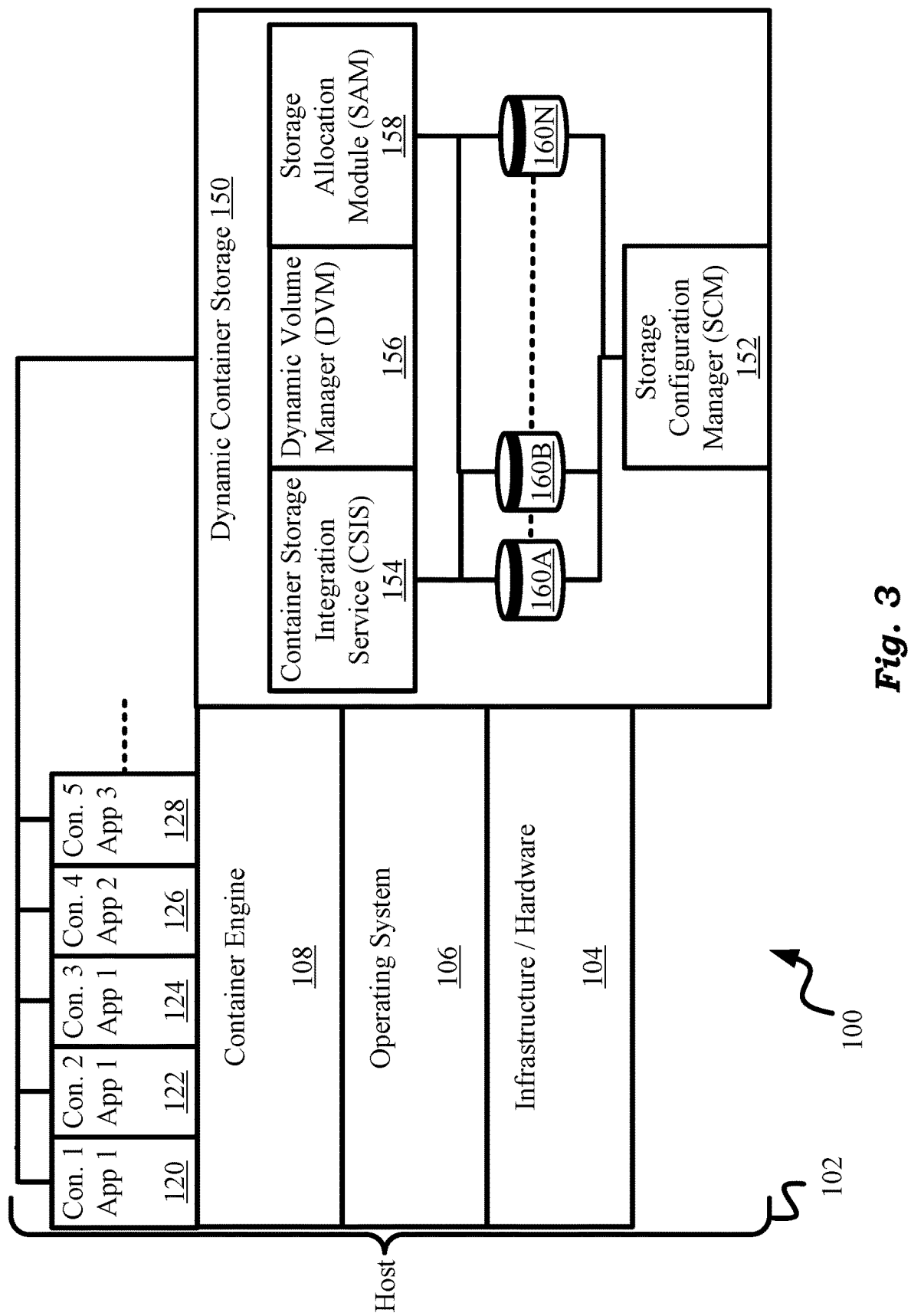
FIG. 3 shows the dynamic container storage of the containerized environment of FIG. 2 in an expanded form.
Figure 12:
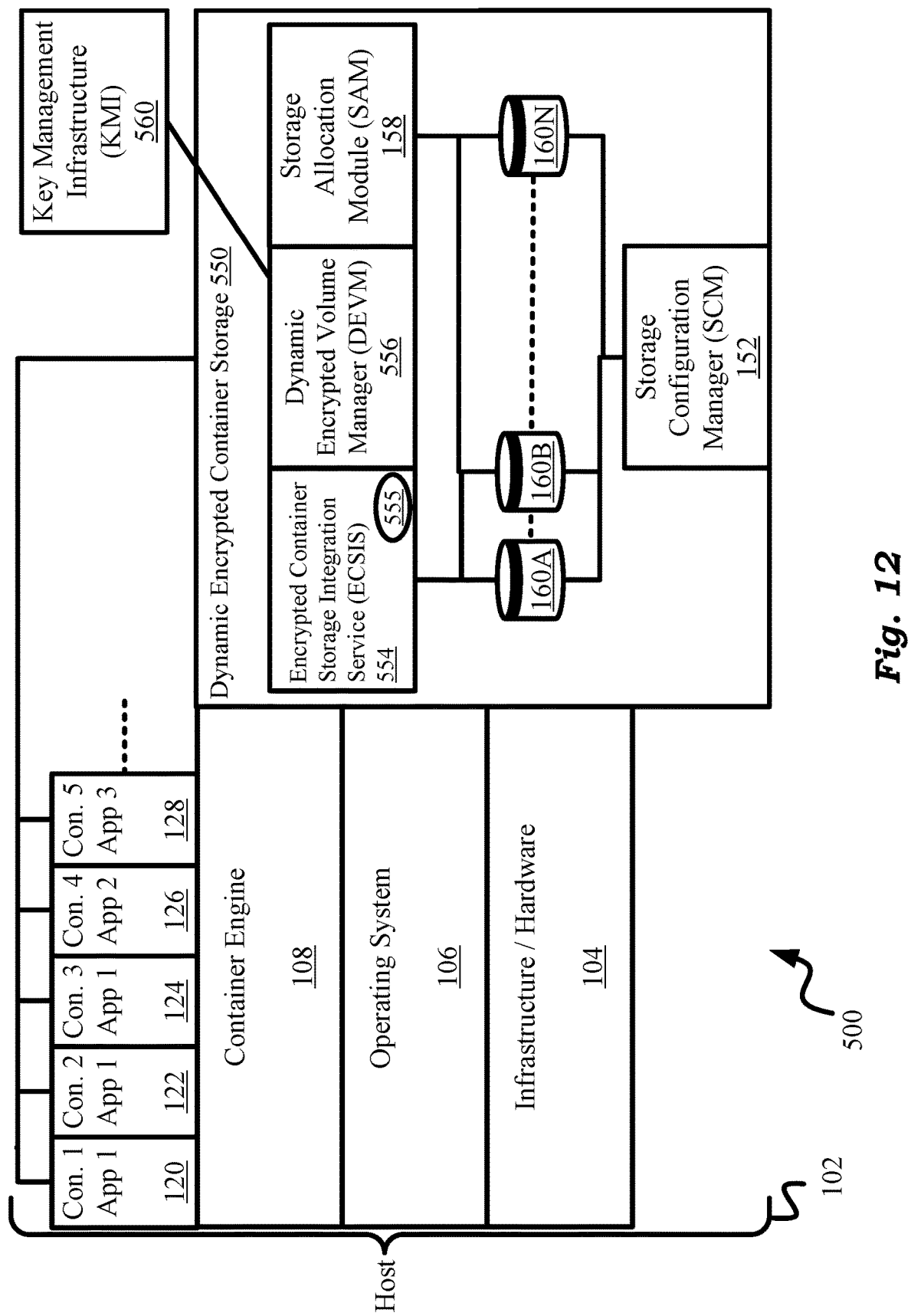

FIG. 12 is a variation of FIG. 3 showing the dynamic encrypted container storage of FIG. 11 in an expanded form.

Figure 5:
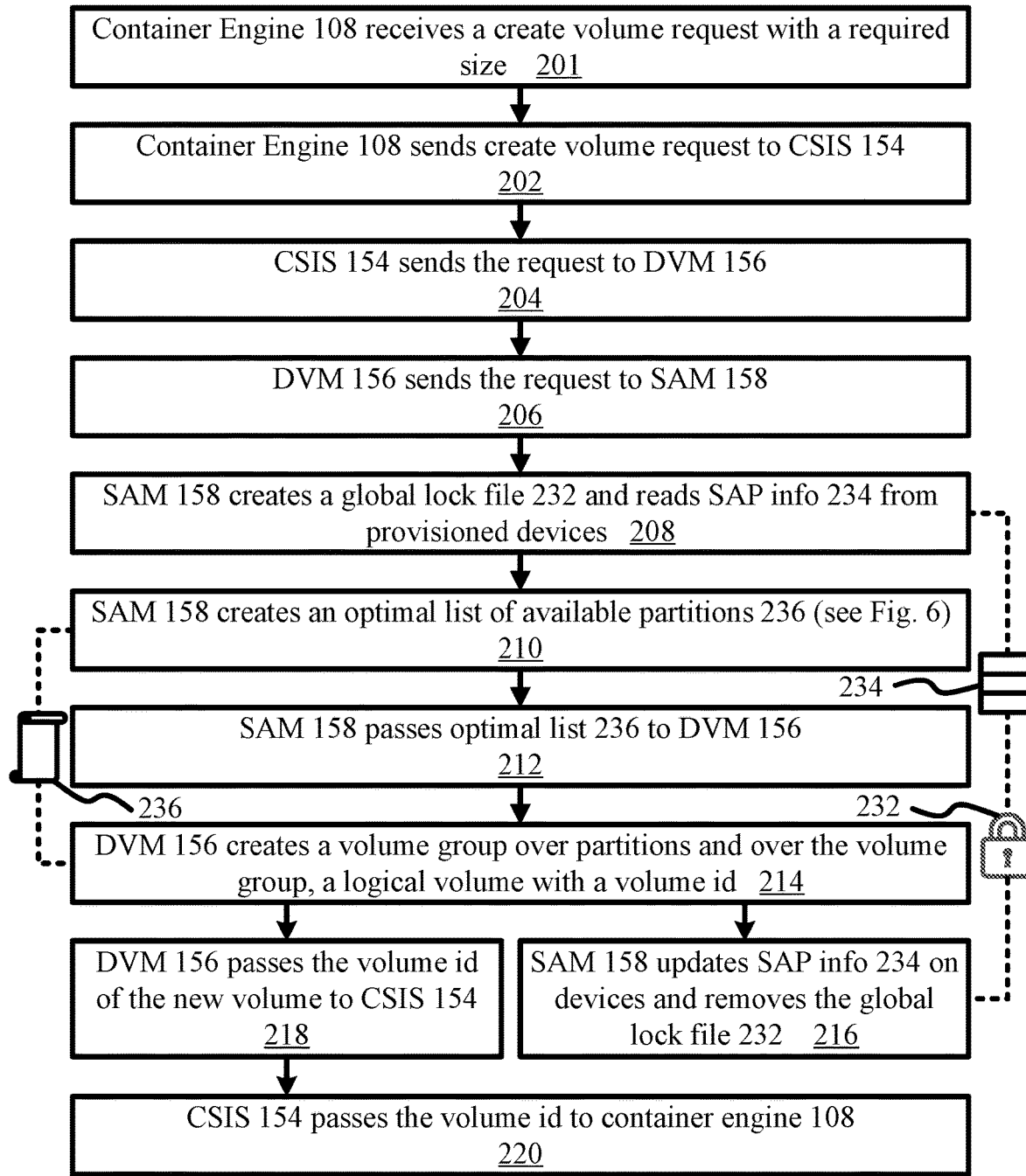
FIG. 5 shows the steps performed in a flowchart form by the dynamic container storage of the present design in order to dynamically allocate a storage volume of the required size on-demand.
Figure 13:
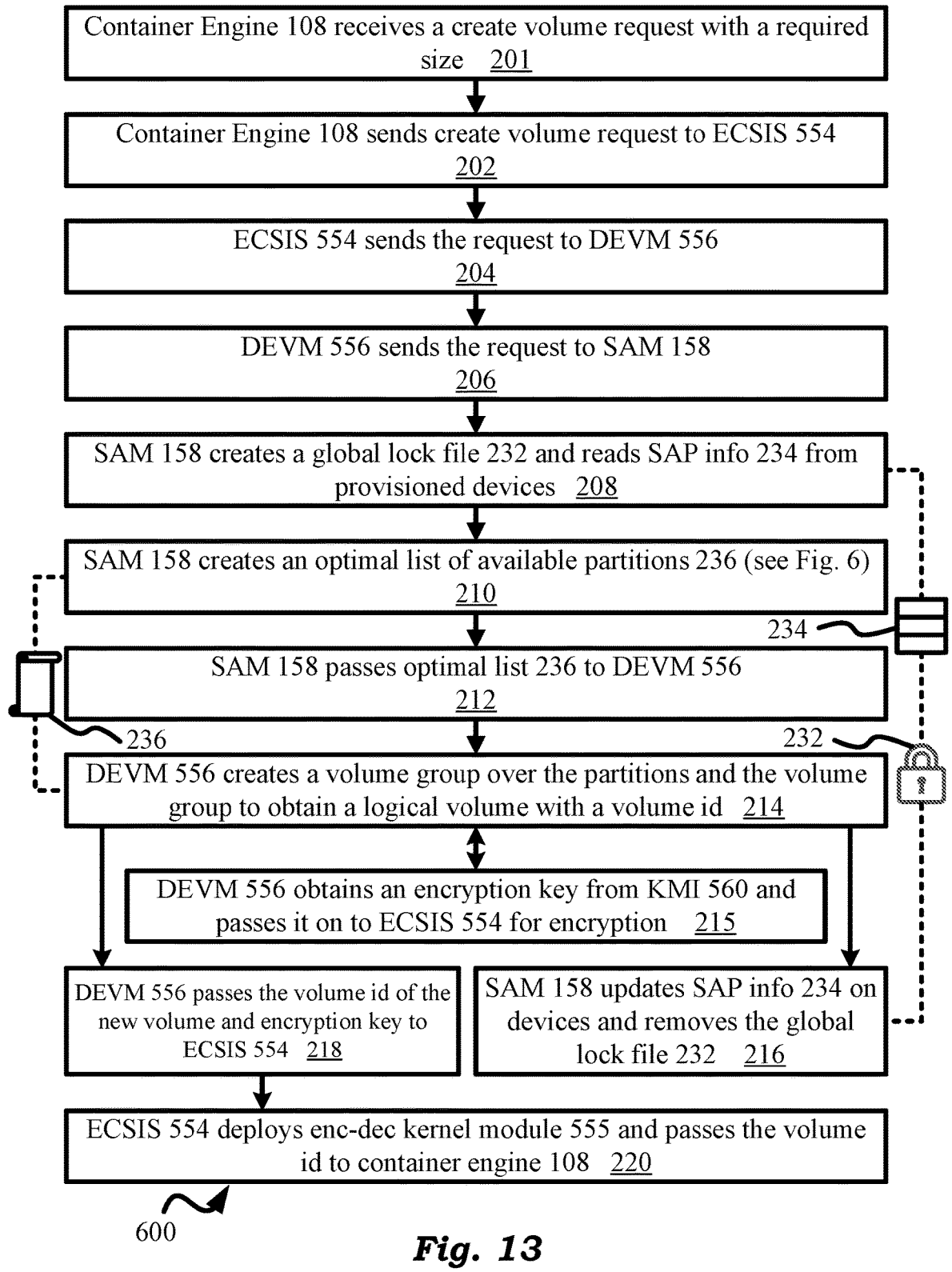

FIG. 13 is a variation of FIG. 5 showing the steps required in a flowchart form for creating a dynamically and optimally allocated encrypted container storage based on the instant principles.

Figure 7:
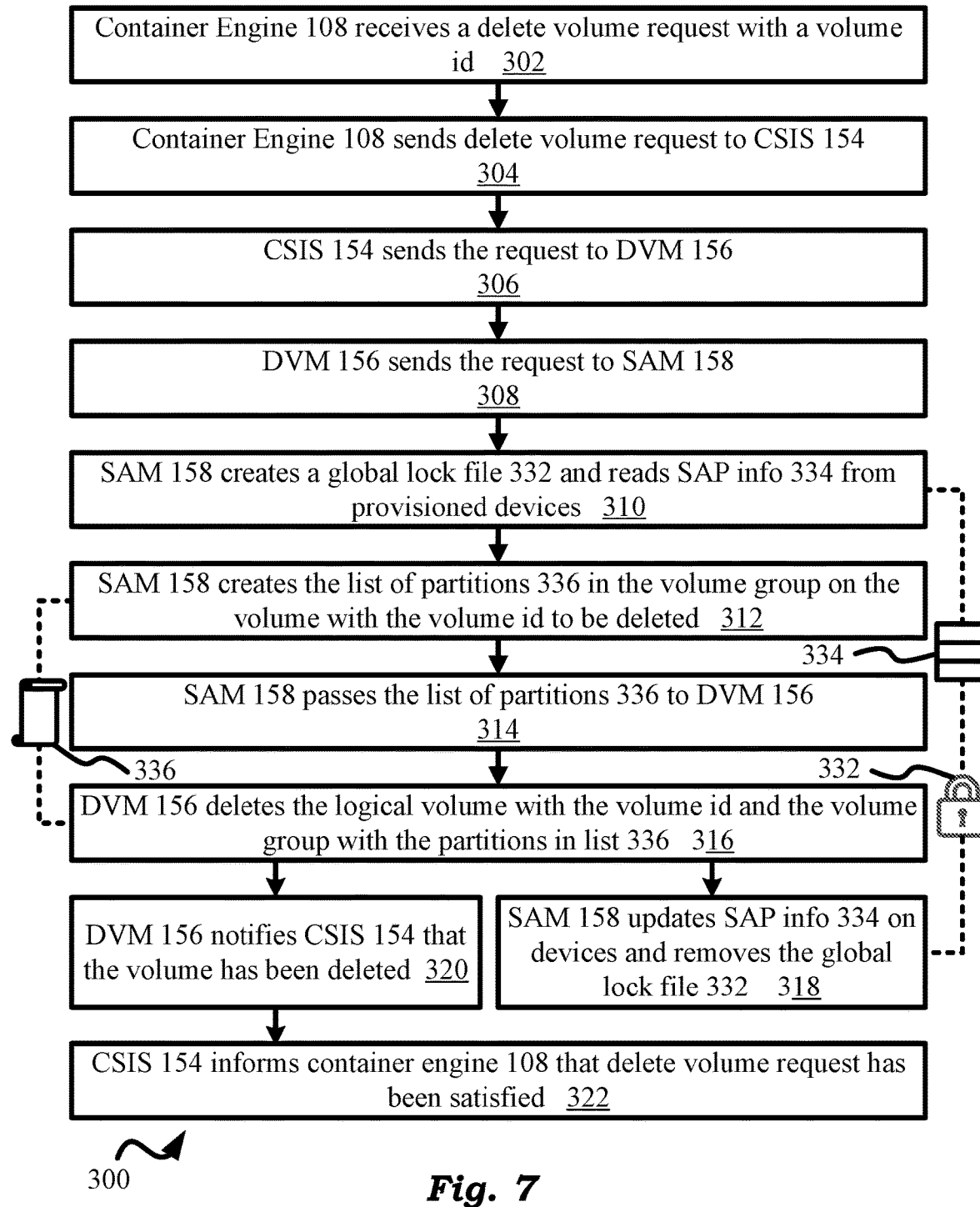
FIG. 7 shows the converse steps of the flowchart FIG. 5 for decommissioning/deconstructing/destroying a storage volume previously created by the instant dynamic storage.
Figure 14:
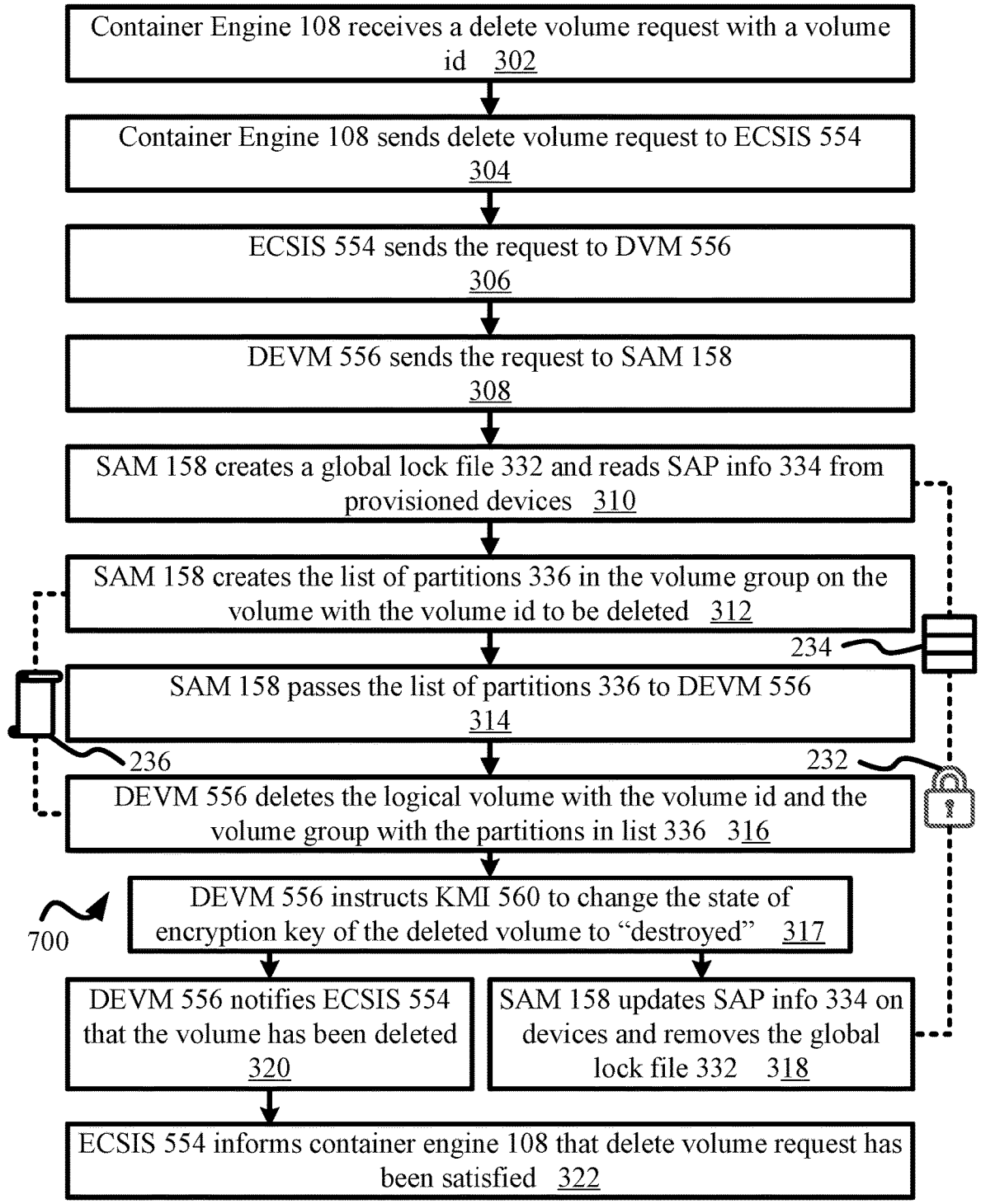

FIG. 14 is a variation of FIG. 7 showing the steps required in a flowchart form for deleting/decommissioning/deconstructing/destroying a dynamically allocated encrypted container storage volume of the present technology.

Figure 15:
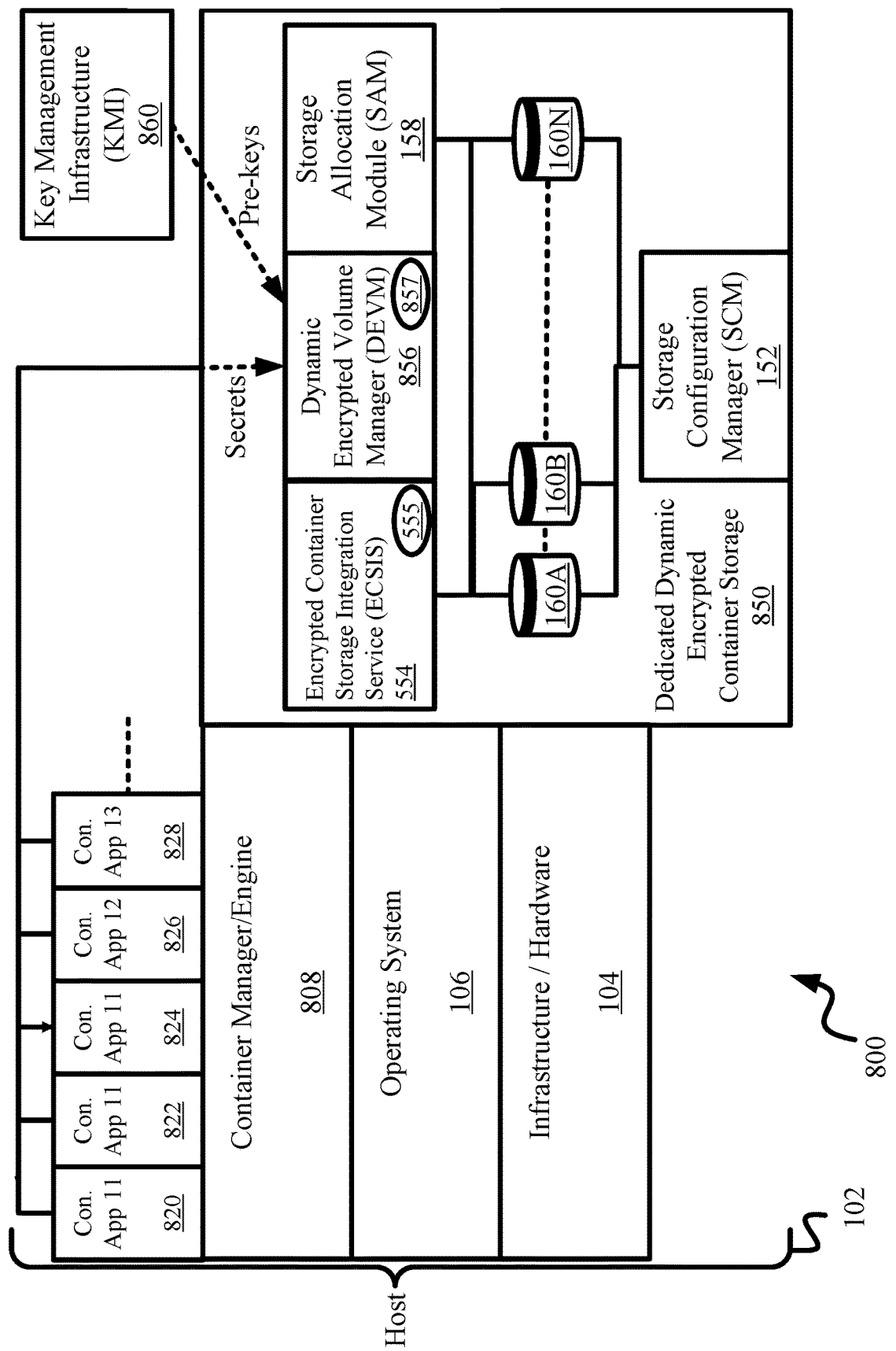

FIG. 15 is a variation of FIG. 12 showing the dedicated dynamic encrypted container storage based on the present design.

Figure 16:
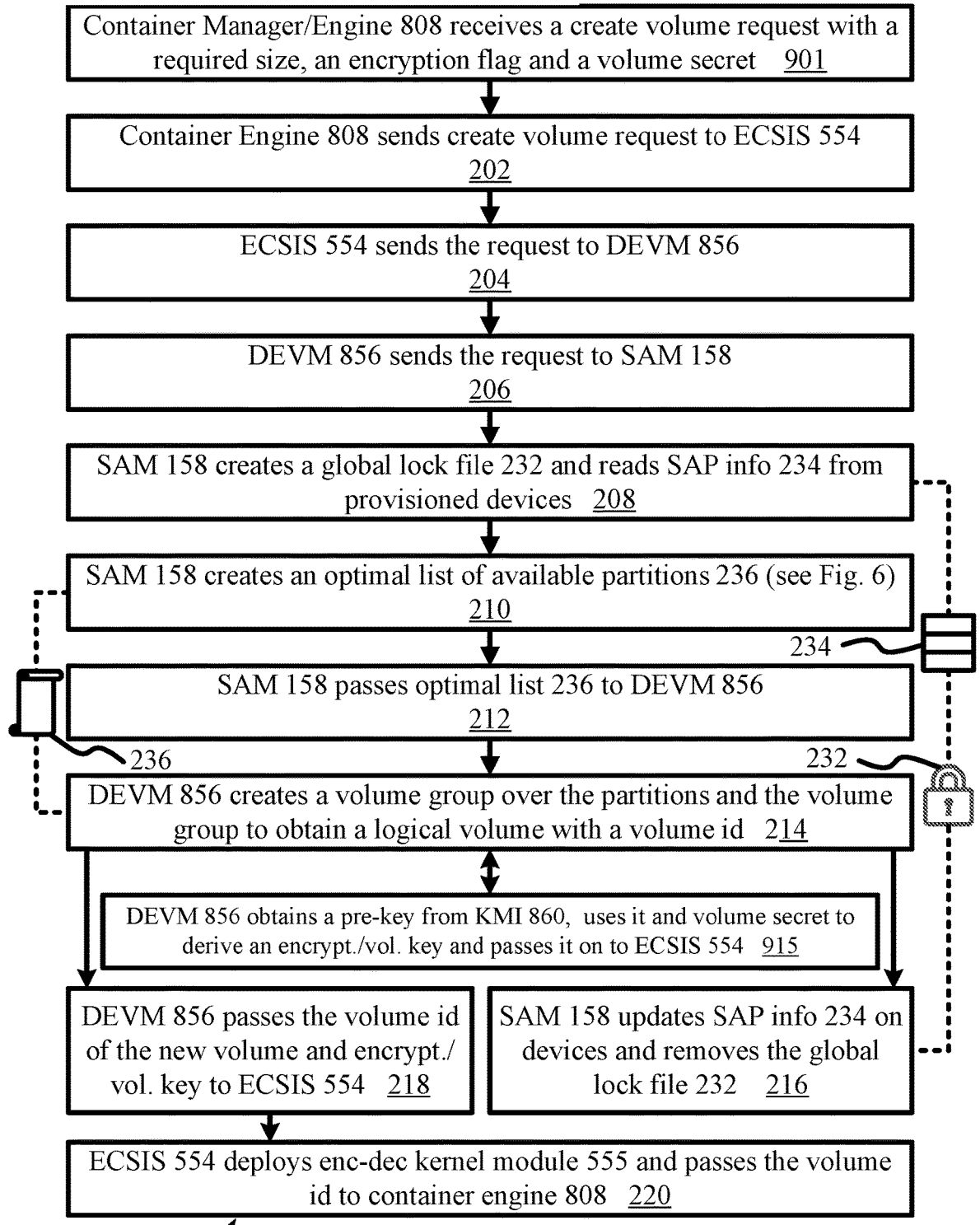

FIG. 16 is a variation of FIG. 13 showing the steps required in a flowchart form for creating a dynamically and optimally allocated dedicated encrypted container storage based on the instant principles.

Figure 17:
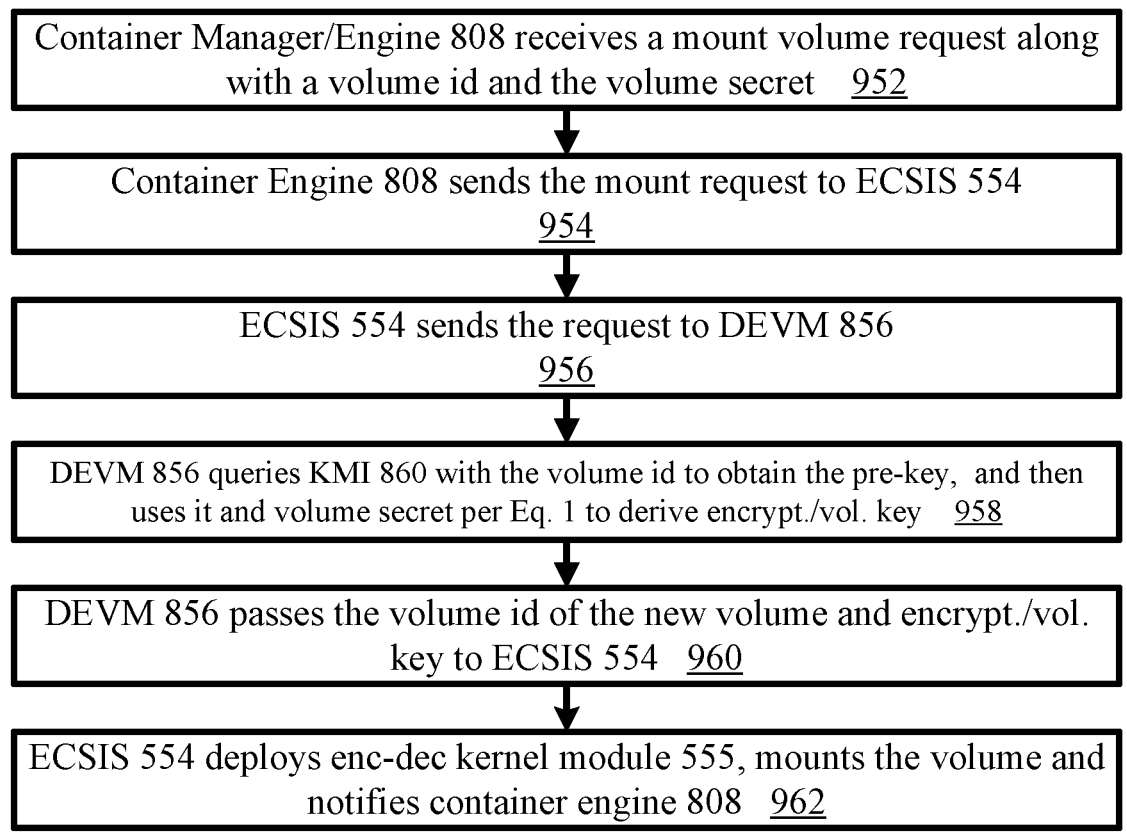

FIG. 17 explicitly shows the steps required in a flowchart for mounting an encrypted container storage of the present design.

Figure 18:
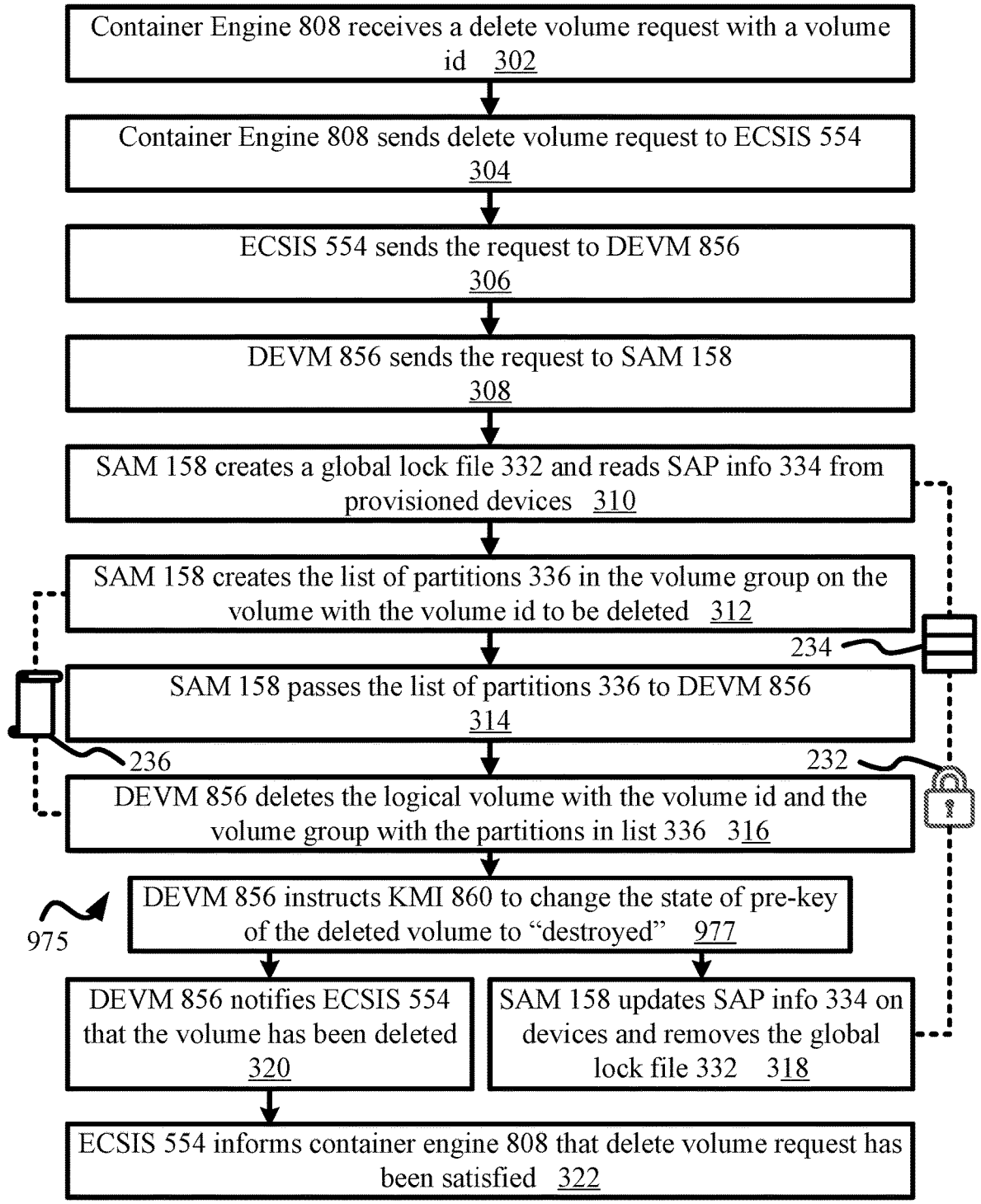

FIG. 18 is a variation of FIG. 14 showing the steps required in a flowchart form for deleting/decommissioning/ deconstructing/destroying a dynamically allocated dedicated encrypted container storage volume of the present technology.

Figure 19:
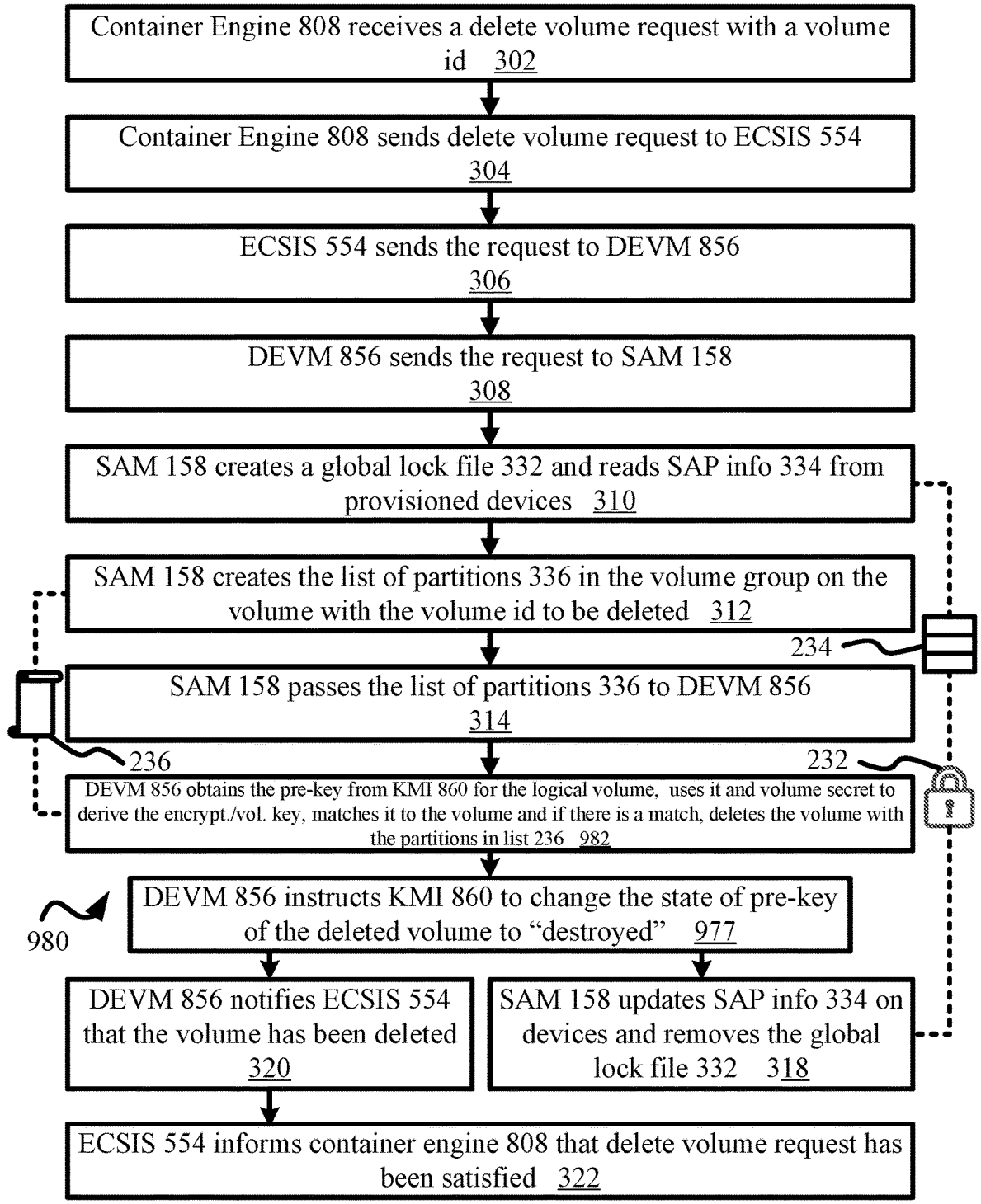

FIG. 19 is a variation of FIG. 18 where the requesting container(s) is/are required to have access to the volume secret for deleting/decommissioning the dedicated encrypted storage volume.

Figure 20:
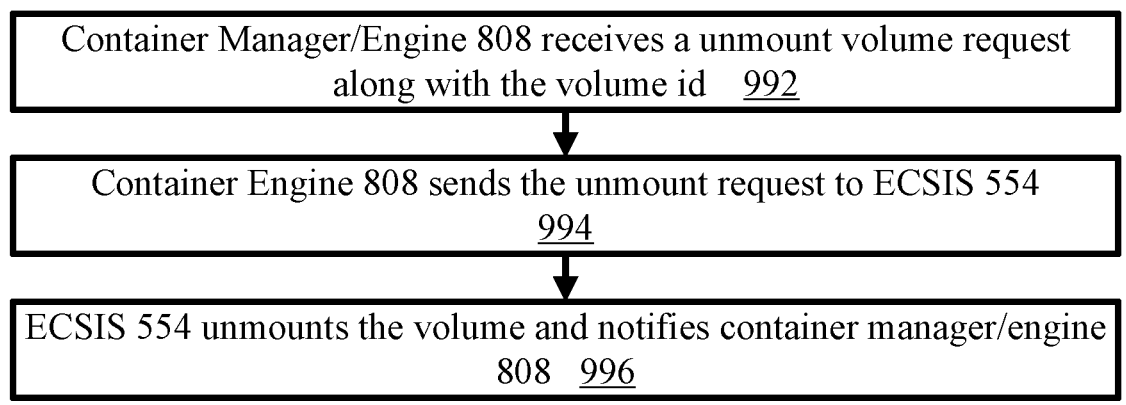

FIG. 20 explicitly shows the steps required in a flowchart for unmounting an encrypted container storage of the present design.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The techniques described herein may employ computer code that may be implemented purely in software, hardware, firmware or a combination thereof as required for a given implementation. The present invention will be best understood by first reviewing the systems and methods for dynamically allocating storage for a containerized environment as illustrated in FIG. 2. As will be taught herein, containerized environment 100 is an improvement upon the prior art containerized environment shown and explained in the background section in reference to FIG. 1.

Containerized environment 100 of FIG. 2 shows a host system 102 comprising a hardware or an infrastructure layer 104 and an operating system (OS) layer or simply OS 106 running on infrastructure/hardware layer or simply infrastructure or hardware 104. While in some embodiments it is conceivable that infrastructure 104 physically belongs to host 102, in alternative embodiments it is also possible that infrastructure 104 is provided on top of an infrastructure-as-a-service (IaaS) known in the art. Exemplary IaaS solutions available in the industry include Amazon Web Services (AWS), Microsoft Azure, Rackspace Open Cloud, Google Cloud Platform, HP Enterprise Converged Infrastructure, IBM SmartCloud Enterprise, Green Cloud Technologies, etc.

Therefore, OS 106 may execute on the hardware of a host machine or atop an IaaS layer provided by an IaaS provider such as the ones mentioned above. In the latter scenario, OS 106 may be provided as a part of the IaaS offering/solution itself from an IaaS provider. The present design is agnostic of the many ways in which infrastructure 104 and operating system 106 of the containerized environment 100 may be provisioned for various implementations.

Containerized environment 100 of FIG. 2 also shows a container engine 108 executing containers 1, 2, 3, 4, 5, ... represented by reference numerals 120, 122, 124, 126, 128, .... Each container is a lightweight virtualization mechanism that leverages operating system 106 and hardware/infrastructure 104 in a contained environment in which one or more processes execute. The container behaves as if it had its own hardware and operating system. Container engine 108 is a component of the containerization software/ solution/suite necessary to manage the containers. In particular, container engine 108 is responsible for managing the lifecycles of containers 120, 122, .... Exemplary containerization solutions available in the industry include Docker, Red Hat OpenShift, rkt, etc.

Also shown in FIG. 2, is a dynamic container storage mechanism or module or simply dynamic container storage mechanism/subsystem/system or simply dynamic container storage 150 of the present design. Persistent storage for containers 1, 2, ... on dynamic container storage 150 is provided via host volumes or storage volumes as will be discussed herein. The present techniques of dynamic storage allocation for containers apply to any of the above-referenced industry solutions for infrastructure 104, operation system 106 and container engine 108.

However, for convenience and clarity, several exemplary implementations described herein may make specific references to Docker™ containers with their associated constructs on a Linux operating system. Container engine 108 is typically implemented using a client/server model, with a client interface that interacts with a backend server or daemon. The client interface is typically a command line interface (CLI) communicating with the backend daemon on a network. An exemplary CLI accessed via a computer/ terminal/workstation is shown in FIG. 2 by reference numeral 109.

In a containerized environment such as environment 100 of FIG. 2, the main types of users are administrator users or admins, developer users or simply developers and operator users or simply operators. The users of environment 100 are not shown explicitly in FIG. 2 to avoid clutter. An administrator's responsibility is to ensure the overall well-being of the environment, its users and resources. The developers are in charge of developing the containerized applications, such as applications 1, 2, and 3 shown in FIG. 2. The operators are responsible for operating the containerized applications according to their specific objectives. Note, that at times the various roles of the users above may also overlap with one another as needed.

An operator typically issues commands on the above-mentioned CLI 109 of container engine 108 to accomplish various tasks for the containerized applications. For example, the operator may issue commands to instantiate a container with a specific configuration required for an application. Such a configuration includes specifying the container image of the container, its working directory, list of required packages, network ports communicable externally to the container, any environment variables and the name of the executable file for the application to be run in the container. Based on the present technology, the required configuration may also include the amount of storage space required for the container/application as will be further taught below.

A container image, or simply an image, is a file comprising instructions for a complete and executable version of an application. It also includes definitions about the operating environment, root file system, other attached/mounted file systems, networking, and operating modules, as well as any other components of a complete execution environment. An image specifies the system libraries, tools, and other files and dependencies for the executable code. An operator can create one or multiple containers based on a given container image. Image developers can reuse static image layers for different projects.

As mentioned, an operator user of containerized environment 100 of FIG. 2 instantiates a container or containers from the above-mentioned interface of container engine 108. Depending on the containerization software used in environment 100, the operator may do so in a number of ways. One such way is to execute a standalone command at CLI 109 that creates a container with an image and executes an application in it. In the case of docker containerization software, this command may be "docker run". In this scenario the required configuration of the container is specified in a configuration file, e.g. "dockerfile".

An alternate way is to start a service in a container. A service is a component of an overall "composable" application. An exemplary application 1 is shown as executing in containers 1, 2 and 3, and exemplary applications 2 and 3 in containers 4 and 5 respectively in FIG. 2. In the case of docker software, the required configuration of a multi-container composable application is typically specified in a configuration file, e.g. a "docker-compose.yaml" file. The application may also be a microservices application running on any number of containers in containerized environment 100. Any number of containers, applications, and storage devices may be present in the containerized environment.

After having described the basic structure of the containerized environment 100 of FIG. 2, let us now look at the main embodiments of the present technology in greater detail. Note first that in the present teachings for brevity, unless otherwise noted, we may refer to the container or the operator issuing commands on its behalf synonymously. Furthermore, the commands may be issued manually on a CLI such as the one shown in FIG. 2 by reference numeral 109, or be specified in a script or a configuration file, as will be appreciated by those skilled in the art.

Regardless of how a container is instantiated, the operator can specify one or more host volumes or storage volumes to be required for the container. For example, in the case of docker software, the operator may issue a "docker run" or a "docker service create" command along with a "-v" option/flag for creating a new storage volume. Alternatively, the operator may specify a "-mount" option for mounting an existing storage volume. These options/flags respectively signal a request to container engine 108 to create a storage volume or to mount an existing volume for the requesting container.

Figure 1:
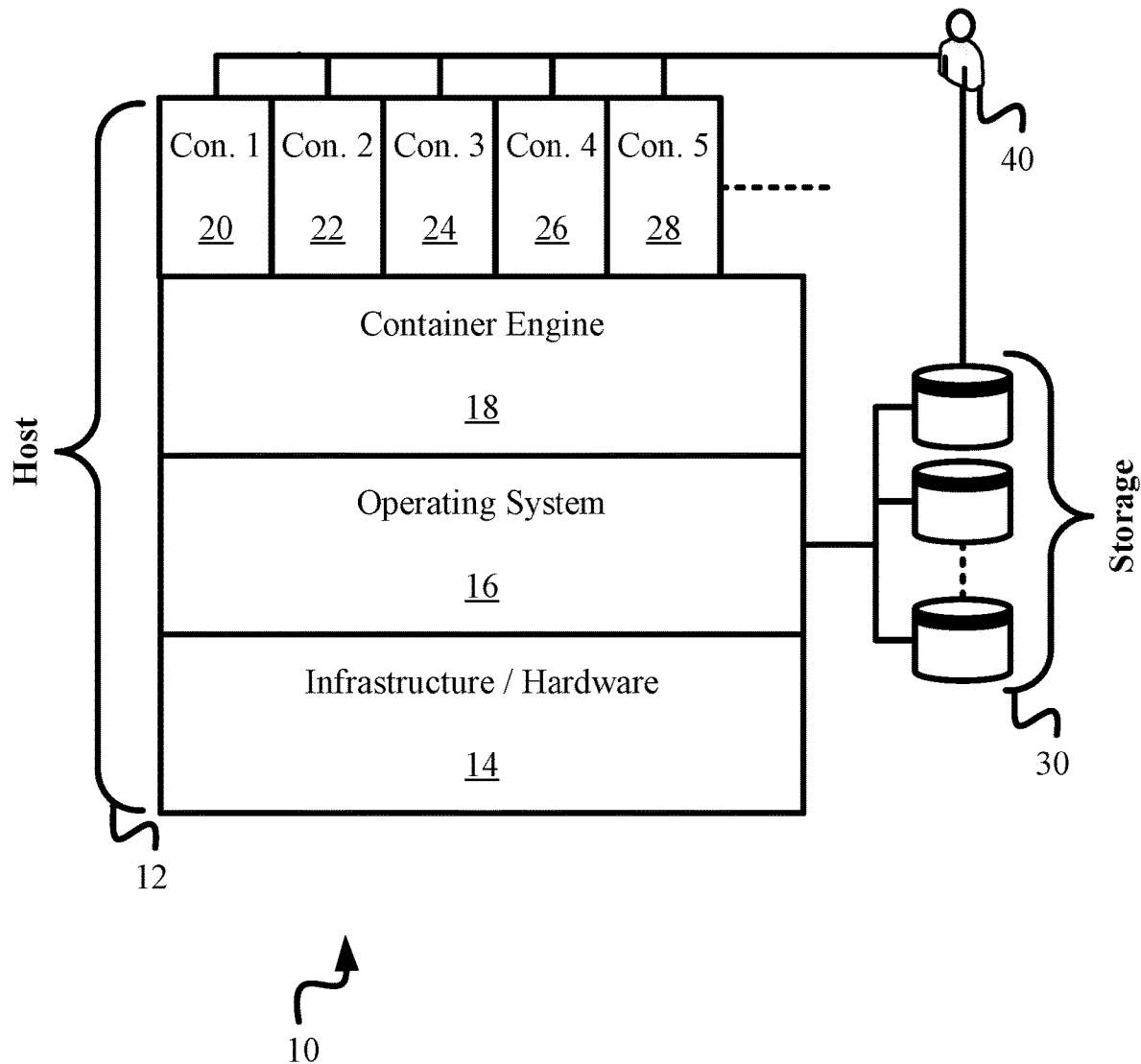
FIG. 1 is a block-level diagram of a typical containerized environment of the prior art.

As explained in the background section in reference to FIG. 1, while issuing the above-referenced request for creating a volume in the prevailing systems, the operator has no control over specifying the amount of storage needed in the volume. As an improvement over the prior art according to the present techniques, such a request can now be accompanied by an option/flag/parameter for specifying the required size of storage. The flag in the request specifies the amount of storage needed on-demand in dynamic or elastic container storage 150 for the specified volume.

Exemplarily, the required size may be specified by using a "-size" flag/option along with a "docker run -v" or "docker service create" or a "docker volume create" request/command. Container engine 108 then passes such a request to dynamic container storage mechanism 150 of FIG. 2 that dynamically provisions/allocates storage volume of the required size for the container. More than one such requests with -v flags may be specified along with respective -size flags to request multiple storage volumes of the requisite sizes.

To understand in detail the techniques behind the workings of instant dynamic container storage 150 of the present design, let us now refer to the embodiment shown in FIG. 3. FIG. 3 shows many of the same elements of FIG. 2 but with dynamic container storage 150 shown in its expanded form. More specifically, FIG. 3 shows that dynamic storage 150 comprises a storage configuration manager or module or subsystem (SCM) 152 running on host 102. SCM is responsible for provisioning and partitioning of storage devices 160A, 160B, . . . 160N of dynamic container storage 150 shown in FIG. 3. Note that there may be other storage devices configured on the host not under the purview of SCM 152. In other words, SCM 152 is in charge of provisioning/partitioning only those devices that may be used by instant dynamic container storage 150.

Figure 4:
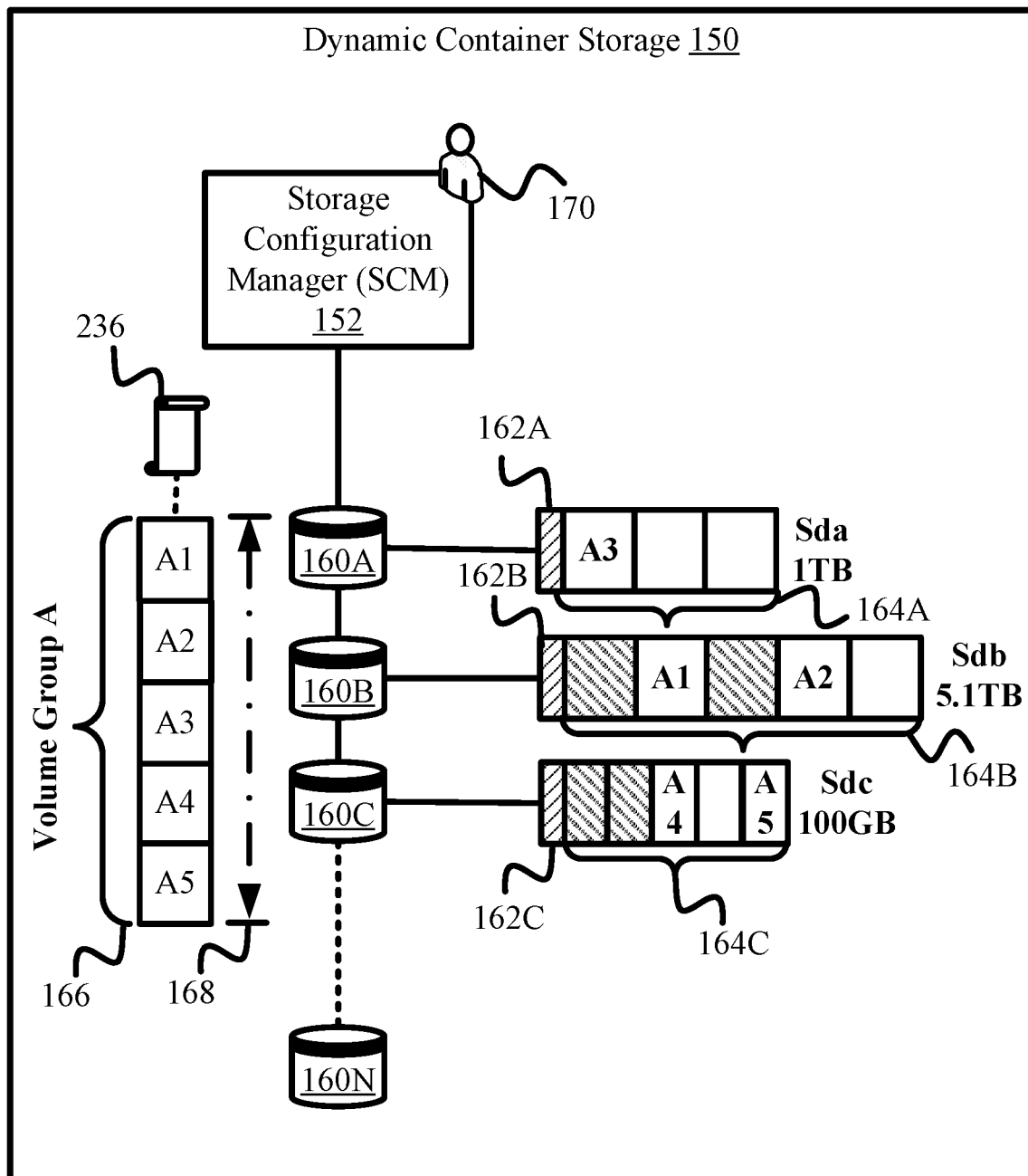
FIG. 4 shows the storage devices of FIG. 2-3 with their partitions/slices/allocation units and an assembled storage volume based on the instant techniques.

In the preferred embodiment, SCM is a standalone component or program of dynamic container storage mechanism 150, that is used by an administrator. In order to better understand the working of SCM 152, let us now take advantage of FIG. 4. FIG. 4 shows storage devices or disk drives 160A, 160B, 160C, . . . , 160N from dynamic container storage 150 of FIG. 2-3. It also shows an administrator or admin 170 using SCM 152 introduced above. Note that other elements from FIG. 2-3 have been omitted from FIG. 4 to facilitate focus on the present principles being taught.

According to the present design, admin 170 uses SCM 152 to provision storage devices for containerized environment 100 of FIG. 2-3. What this means is that admin 170 may add storage disk/drives/devices to containerized environment 100 and more specifically to container storage system/mechanism 150 during the course of the operation of the environment. Exemplarily for provisioning device 160C, admin 170 would first install the device/drive and have it recognized on host 102 shown in FIG. 2-3 using techniques known in the art. The admin would then use instant SCM 152 to partition or slice the device into its constituent partitions, slices or allocation units. Unless otherwise indicated, these terms, partitions, slices or allocation units are used synonymously in this disclosure.

The number of such allocation units or slices is given by the formula:

min(max. no. of slices allowed per device−1,⌊(device capacity−size of dm partition)/min. size of the allocation unit⌋).

Here, operator ⌊ ⌋ represents a floor or truncation operation. The first partition is reserved and serves a special purpose and that is why we see a subtrahend of "1" in the above formula. Exemplarily, this first partition is referred to as dynamic metadata or "dm" partition for short. That is because it is used to store the metadata required for the operation of dynamic container storage 150 as will be further explained below. The maximum or max no. of slices allowed on a device may vary depending on OS 106 and other configuration parameters of environment 100. Typically, this number is 128.

Let us take an example where a newly added device 160C in FIG. 4 has a capacity of 120 GB as shown. The max. no. of slices allowed on the device is typically 128 per above. Let us now assume that the minimum size of an allocation unit that we would like in container storage 150 is 5 GB. Dm partitions may or may not have the same size for each of devices 160A, 160B, 160C, . . . 160N. In an exemplary implementation of the present technology, this size is 10 MB for each dm partition 162A, 162B, 162C, . . . shown in FIG. 4. Then the number of allocation units created by SCM 152 on device 160C will be min(128−1, ⌊(120 GB−10 MB)/5 GB⌋)=min(127, ⌊23.998⌋)=23. These allocation units or slices or partitions are marked by reference numeral 164C in FIG. 4. In addition, first dm partition 162C is also created by SCM 152.

According to the present design, the dm partition of each disk/device holds storage allocation persistence (SAP) metadata or simply SAP metadata/data for the device. Recall from above, that it is SCM 152 that is responsible for the creation of allocation units or slices on the devices on host 102. SAP data consists of the number of partitions/slices that exist on the device along with their respective partition ids. SAP data also includes a status indicator or flag to indicate whether the partition corresponding to a given partition id is allocated/in-use or otherwise unallocated/unused. In other words, SAP contains a list of partition ids on the device along with a flag that indicates whether the slice/partition is available for data storage or is otherwise already in use.

Let us now refer back to FIG. 3 to continue expanding our understanding of the various aspects of the present design. In addition to SCM 152 in dynamic container storage 150 of FIG. 2-4, there is also a container storage integration service (CSIS) or volume driver 154, a dynamic volume manager (DVM) 156 and a storage allocation module or engine (SAM) 158. Exemplary implementations of CSIS/driver based on instant principles include Docker™ volume driver, Kubernetes™ container storage class, PersistentVolumeClaim, and interface (CSI), Red Hat™ Openshift operator, rkt, etc.

The above subsystems or modules are responsible for dynamically "create"-ing, "delete"-ing, "mount"-ing and "unmount"-ing storage volumes based on the instant techniques taught herein. In variations, the functionalities of modules 152, 154, 156 and 158 shown in FIG. 3 and explained herein may be allowed to overlap or merge. In other words, as needed, it may be possible to combine DVM 156 and SAM 158 into a single module, CSIS 154 and DVM 156 into a single module, etc.

In order to better understand the functionalities of these subsystems or components of dynamic container storage 150, let us now take advantage of the flow diagram or flowchart 200 shown in FIG. 5. First, recall from above that it is a user/container, for example, container 1 in FIG. 2-3 that initiates a request for a storage volume of a required size. Such an on-demand "create volume" request of a specified storage size afforded by the present techniques is then passed onto container engine 108 per above. This is shown by box/step 201 in flowchart 200. Container engine 108 now passes this request to CSIS 154 as shown by process block or step 202. CSIS 154 passes this request to DVM 156 per block or step 204. In turn, DVM 156 sends this request to SAM 158 as shown by block 206.

As shown by block 208, SAM 158 now creates a global lock file 232 shown by the lock symbol in FIG. 5. It then reads the storage allocation persistence (SAP) metadata/data 234 discussed above from the dm partitions of each storage device provisioned/available on host 102. The reason it creates the lock file is to prevent another instance of SAM 158 from modifying the allocation information while it completes the current allocation request per below explanation. This locking in the present design ensures the integrity of SAP data 234 of dynamic container storage 150.

SAM 158 now creates an optimal list 236 of the partitions/slices on the various devices on host 102 that will satisfy the storage size requirement specified in the create volume request received by container engine 108 at step/block 201. This is shown by block/box 210. SAM 158 satisfies the size requirement by assembling or combining partitions/slices from the storage devices on host 102 in an optimum manner, and hence the term optimal list marked by numeral 236 in flowchart 200.

Let us now understand the tasks performed by SAM 158 at step/box 210 of flowchart 200 in a preferred embodiment in great detail. For this purpose, let us take advantage of flowchart flow diagram 250 shown in FIG. 6. In other words, flowchart 250 shows the operations of SAM 158 behind box 210 of flowchart 200 in an exploded/expanded form.

Figure 6:
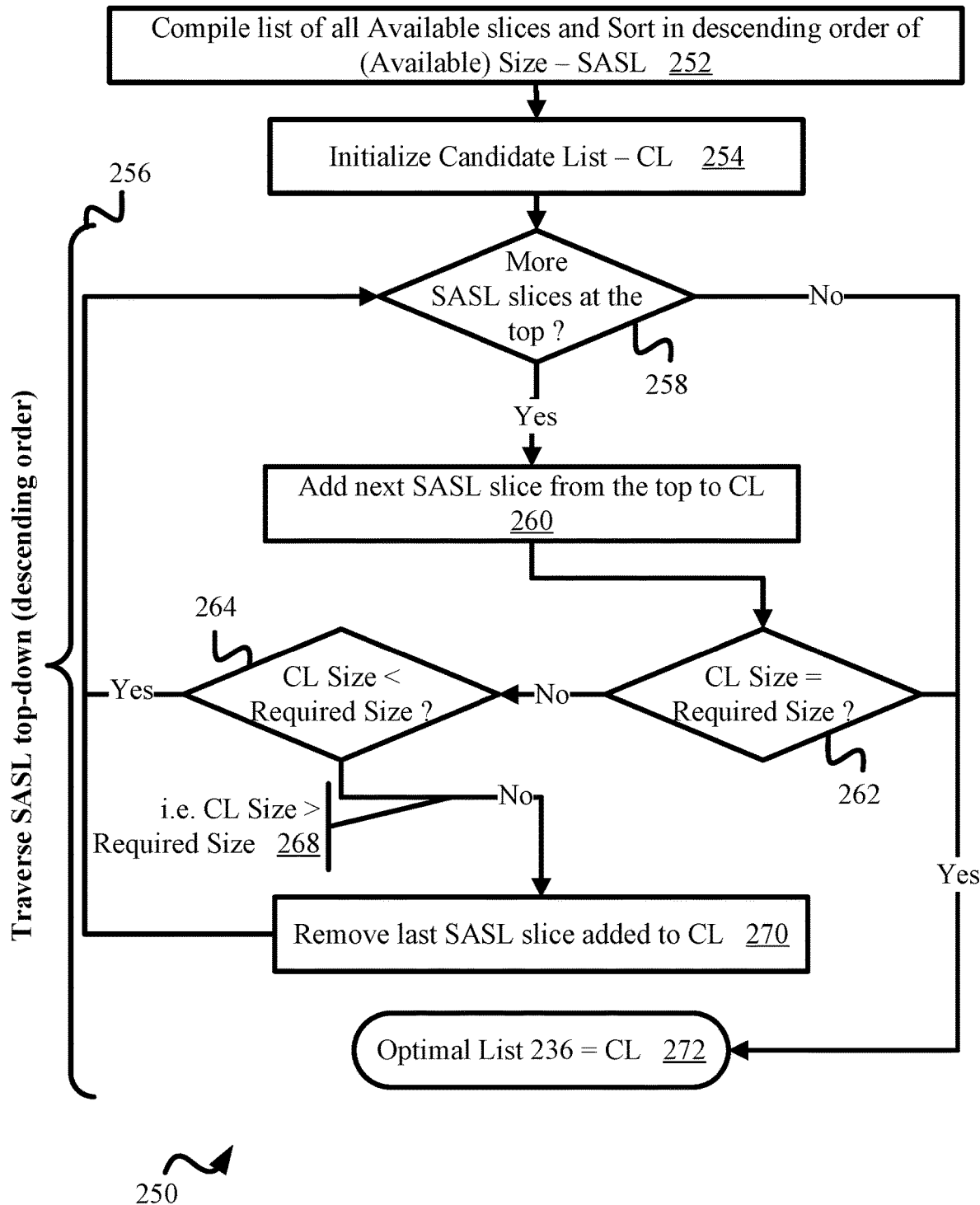
FIG. 6 shows the detailed steps taken by a storage allocation module (SAM) of the instant design for creating/assembling an optimal list of partition ids satisfying a create volume request of a specified size.

As a first step, SAM 152 creates a list of all slices/partitions on all the devices on host 102 that are marked as unused or available in the SAP data of their dm partitions. In a preferred embodiment, it does so by building an allocation information structure (AIS) in memory. AIS, not explicitly shown in FIG. 6, is a data structure containing the ids of all allocation units in all storage devices on host 102 along with the corresponding allocation flags indicating whether or not each allocation unit is available or unallocated.

Thus, based on AIS, SAM 158 constructs a list of all available/unallocated slices/partitions on the devices. It then sorts this list in descending order of the size of the slices or allocation units available to obtain a sorted, available slices list (SASL). The above steps of obtaining the SASL are collectively shown by box 252 in flowchart 250. SAM 158 then initializes a candidate list (CL) data structure whose purpose is to temporarily hold the ids of the slices during the construction/assembly of optimal list 236. This task/step is shown by box 254. SAM 158 then traverses SASL in a top-down fashion or descending order of the size of available slices as shown by brace 256 in FIG. 6.

Starting from the top of SASL, SAM 158 checks if there more slices available in its top-down traversal of SASL as shown by decision diamond 258. If the answer to this check/decision is No, then SAM 158 terminates its operation by providing the contents of CL as optimal list 236 at step/box 210 of FIG. 5 as will be explained further below. This step is shown by terminator 272 in FIG. 6. However, if there are more slices available at the top of SASL, then as shown by box 260, SAM 158 adds the next biggest slice/partition at the top of SASL to CL. In other words, SAM 158 operates in a "greedy" manner and adds the biggest available slices from the available storage devices first.

Now, as indicated by decision diamond 262, if the total size of the slices in CL, or simply put CL size, exactly matches the required size of storage in the create volume request at box 201 of FIG. 5, then SAM 158 is done. What this means is that, at this point optimal list or the best available list of slices to satisfy the above request are contained in the CL. Hence, SAM 158 outputs the contents of the CL as optimal list 236, as shown by terminator 272 of flowchart 250. Now, the storage allocation operation for create volume request of flowchart 200 of FIG. 5 resumes at its step/box 210 per further explanation below.

However, if the answer to decision diamond 262 is a No, then SAM 158 checks if the CL size is less than the required size. This check is shown by decision diamond 264. If the answer to this decision/check is a Yes, then SAM 158 continues its operation by going back to decision diamond 258 and checking to see if more slices are available in descending order from the top. If so, it adds the next available (biggest) slice per box 260 and continues per above explanation.

If the answer to decision diamond 264 is a No, then this means that CL size exceeds the required size in the original request. This is indicated by callout 268 in flowchart 250. In this case, SAM 158 removes the last slice added as candidate per box 270. It then returns to box 258 and the operation continues per above explanation. In other words, SAM 158 looks for the next smaller slice from the top in SASL and adds that to CL and performs checks 262, 264 again.

Thus, per box 270 SAM 158 modifies/improves upon its initial greedy choice of slice allocation and removes the excess storage. If there are no further smaller slices available at the top of SASL at decision diamond 258, then that could mean one of two scenarios, (i) either now CL contains enough slices that just/optimally exceed the required size of storage, (ii) or CL contains all available slices that it can but is still unable to fully satisfy the required size. In either scenario, SAM 158 completes the optimal list creation operation by outputting the contents of its CL as optimal list 236 per terminator 272 as shown. Now the process of storage allocation for create volume request of FIG. 5 can resume at its step/box 210 and per explanation further below.

Thus, referring back to FIG. 4, in the manner explained above, SAM 158 of dynamic container storage 150 of the present embodiment is able to allocate storage resources from devices 160A-N for satisfying the original create volume request at box 201 of flowchart 200, in the most resource and cost-efficient manner.

Let us now walk through a concrete example in concert with FIG. 4 and FIG. 6 to understand the present functionality of dynamic container storage 150, and more particularly SAM 158 in even greater detail. In the example shown in FIG. 4, allocation units or slices 164A are of 330 Gigabytes (GB) each on a device named sda (or/dev/sda) having a capacity of 1 Terabytes (TB). Slices 164B are of 1 TB each on a device named sdb (or/dev/sdb) with a capacity of 5.1 TB, and slices or allocation units 164C are of 18 GB each on device sdd (or/dev/sdd) with a capacity of 100 GB. The slices that are available for allocation amongst slices 164A-C have a white background while those that have already been allocated are shown with a hatched pattern.

Let us assume that the size required in the create volume request per above is 2.3 TB. Then according to the present embodiment, SAM 158 will make a list in descending order of size of available slices at step 252 of flowchart 250, and as a part of step/box 210 of flowchart 200. Per step/box 252, this list, referred to as sorted, available slices list or SASL will comprise of available slices amongst slices 164B (1 TB/slice), then 164A (330 GB/slice) and then 164C (18 GB/slice).

Next, SAM 158 will initialize a candidate list or CL per box 254. Based on the above explanation of flowchart 250, and specifically decision 258, box 260 and decisions 262, 264, SAM 158 will add 3 unallocated slices from slices 164B in CL. At decision/check 264 per above, SAM 158 will see that total CL size 3 TB exceeds the required size 2.3 TB per callout 268. Per box, 270, SAM 158 now removes the last of slices 164B that was added to CL. Per decision 258, box/step 260, and decisions 262 and 264 again, SAM 158 now adds slices from 164A until CL size exceeds 2.3 TB.

Now CL consists of two slices from 164B and two slices from 164A with a total candidate/CL size of 2*1 TB+2*300 GB=2.6 TB which exceeds 2.3 TB. Per box 270, SAM 158 now again removes the last slice added and adds slices from 164C until the size exceeds the required size. It thus adds 2 slices from 164C as candidates with a total CL size of 2*1 TB+300 GB+2*18 GB=2.336 GB which exceeds the required 2.3 TB.

However, now there are no smaller available/unallocated slices left at the top of SASL per decision 258. Therefore, SAM 158 stops and compiles the optimal list of slices as its CL, which in turn contains the ids of two unallocated slices A1 and A2 from slices 164B, 1 unallocated slice A3 from slices 164A and 2 unallocated slices A4 and A5 from slices 164C. In other words, as shown in FIG. 4, SAM 158 prepares optimal list 236 of the present example as consisting of 5 slices/partitions with partition ids A1, A2, A3, A4 and A5.

It should be noted that in other related variations, different implementations for SAM 158 are also conceivable within the present scope that generate a list of partitions that satisfy the size requirements of the create volume request. Such implementations may benefit from a number of resource allocation techniques and algorithms known in the art.

Let us now refer back to flowchart 200 of FIG. 5 in conjunction with FIG. 4. After having prepared optimal list 236 of slices that satisfy the requested size requirement at box 210 and per flowchart 250 above, SAM 158 passes this list to DVM 156. This is shown by box 212. Now DVM 156 creates a volume group 166 as shown in FIG. 4 over the list of partitions in optimal list 236 and further creates a logical volume 168 over volume group 166. The above step is shown by box/block 214 in FIG. 5 and volume group 166 is identified as volume group A in FIG. 4. Note that logical volume 168 over volume group 166 will have an associated volume id. DVM 156 will also create a filesystem on logical volume 168, although this step is not explicitly shown.

Depending on the operating system and abstractions for volume management available in environment 100, logical volume 168 may be created without the need to first create volume group 166, or the two steps may be combined together. Regardless, now SAM 158 updates SAP metadata/data 234 of devices having partitions in optimal list 236 that were allocated in the creation of the volume group. In our example above, the affected devices are sda, sdb and sdc. More specifically, SAM 158 updates the status or allocation flags for partitions A1, A2 in dm partition 162B of device sdb to indicate that these partitions are allocated or are no longer available. Similarly, it also updates the status flag for partition A3 in dm partition 162A of device sda to indicate that A3 is used.

Finally, SAM 158 also updates the status flags for partitions A4 and A5 in dm partition 162C of device sdc to indicate that these are no longer available. As indicated by block/box 216 in FIG. 5, once SAM 158 has updated SAP data 234 in the devices per above, it then deletes the global lock file 232. Thus, based on updated SAP data 234, when SAM 158 runs again to satisfy the next request, it would not reallocate partitions that have already been allocated.

At this point, a logical storage volume 168 has been created by DVM 156 of dynamic container storage 150 that satisfies the size requirement specified in the create volume request. DVM now passes the volume id of the newly created volume to CSIS 154 as shown by box 218 in FIG. 5. Then as shown by box 220, CSIS 154 in turn now passes this volume id to container engine 108 thus satisfying the create volume request of the specified on-demand size. Container engine 108 now in turn can provide this volume to the requesting container/user, although this step in not explicitly shown.

Note that in the practice of the present principles, there may be a create volume request followed by a request to mount the volume. Thus, after having received the volume id of the newly created volume per flowchart 200 above, the container/user may now mount the volume and start using it to persist data. As already noted above, the container may mount an existing volume using the interface of container engine 108 of FIG. 2-3. In alternative embodiments, create volume request may also mount the volume for the requesting container, thus obviating the need by the container to issue a separate mount command/request. In these embodiments, CSIS 154 mounts the created volume at step 220 and then passes the volume id of the newly created and mounted volume to container engine 108.

In any case, based on the present principles, dynamic container storage 150 of FIG. 2-4 is able to dynamically allocate storage space of required size on-demand to the containers of containerized environment 100. It does so by dynamically pooling available allocation units/slices/partitions from various devices on host 102, as explained above. Once the dynamically created volume is provided to a requesting container, it can now transparently persist data in the volume without requiring anything special. Furthermore, there is no user involvement needed in dynamically allocating storage for container applications.

In other variations, there may be more than one logical volumes created over a volume group as allowed by the architectural implementation of host 102 and/or storage devices 160A, 160B, . . . 160N. In still other preferred variations, any of storage devices 160A, 160B, . . . 160N may be in the cloud or employ a redundant array of independent disks (RAID) architecture. Any of these devices may be local or remote or in a public/private/hybrid cloud. Exemplary cloud technologies that may benefit from the present design include Amazon Web Services (AWS), Microsoft Azure, Google Cloud Platform, VMware, IBM Cloud, Rackspace, Red Hat, Oracle Cloud, etc.

Let us now also look at the converse aspects of decommissioning/deleting/destroying an existing volume that was created by dynamic container storage 150 of the present design per above. For this purpose, let us take advantage of flowchart 300 of FIG. 7. We begin at block/box/step 302 with container engine 108 receiving a request to delete a volume with a given volume id from a container or a user/operator on its behalf. Container engine 108 then passes this delete volume request to CSIS 154 per step/block 304. CSIS 154 passes the request to DVM 156 per step/block 306 which in turn passes it to SAM 158 per step/block 308.

In a similar manner as for creating a volume per flowchart 200 of FIG. 5, SAM 158 now creates a global lock file 332 and reads SAP 334 from dm partitions of all devices on host 102. It now builds allocation information structure (AIS) in memory as before, and determines the list of partitions 336 in the volume group on which the volume to be deleted exists. This is shown by block 312. SAM 158 then passes list 336 to DVM 156 per block 314. In-memory AIS provides for faster speed of operation of SAM as it processes storage allocation requests.

As shown by block 316, DVM 156 now deletes the logical volume with the volume id, and the underlying volume group containing the list of partitions/slices in list 336. Now SAM 158 updates the SAP data/metadata 334 in dm partitions of devices whose partitions were in list 336, as shown by block/box 318. It then marks/flags those slices/partitions on those devices as available or unallocated. Once it is done updating the SAP data, SAM 158 now deletes the global lock file 332. DVM 156 now notifies CSIS 154 that the requested volume to be delete has indeed been deleted. This is shown by box 320. Finally, as shown by box 322, CSIS 154 can inform container engine 108 that the delete volume request has been satisfied.

Note that in the practice of the present principles, there may be an unmount volume request preceded by the request to delete the volume per above. Thus, the container/user may first unmount the volume before requesting to delete it per flowchart 300 above. However, in alternative embodiments, delete volume request may also first unmount the volume for the requesting container, thus obviating the need by the container to issue a separate unmount command/request. In these embodiments, CSIS 154 at step/block 306 would first unmount the volume with its volume id before passing the delete volume request to DVM 156.

FIG. 8-10 show various screenshots of an exemplary implementation of the present design using docker software. Specifically, FIG. 8A and FIG. 8B present a single screenshot split into a left section 402A and a right section 402B respectively to allow a legible fit onto the drawing pages. The figures show a device/dev/sdb being added using SCM 152 of FIG. 3-4 and related explanation. Note that the script shown with reference numeral 404 houses the functionality of SCM 152 in this exemplary implementation.

FIG. 9 provides a screenshot 410 showing a modified docker volume create command 412 of the above explanation being used to create a zts-test-vol with an option/flag "--opt" and a "size" parameter of 500 MB. The bottom of the screenshot shows that zts-test-vol is clearly recognized by docker as a bona fide volume on the host. Finally, FIG. 10 provides a screenshot 420 showing the creation of a docker container running a MySQL database with storage volume zts-test-vol created in screenshot 410 of FIG. 9 above.

Encrypted Container Storage

In a set of highly preferred embodiments, the optimal and dynamic container storage design taught above is adapted to also provide encryption/decryption on the dynamically/elastically allocated/provisioned storage. To understand the functionality of such an optimal/dynamic encrypted container storage technology of the present embodiments, let us take advantage of FIG. 11. FIG. 11 is a variation of FIG. 2 showing an embodiment 500 with many of the same elements and reference numerals as FIG. 2. However, as important distinctions over the embodiment of FIG. 2, FIG. 12 shows a dynamic encrypted container storage 550 of the present design. Further shown in FIG. 12 is a key management infrastructure (KMI) 560 that is utilized by dynamic encrypted container storage 550 for encrypting dynamically allocated container storage per below teachings.

Let us now look at embodiment 500 of FIG. 12 in greater detail to understand how it encrypts dynamically allocated container storage described in the above teachings. For this purpose, let us take advantage of FIG. 12. In a manner similar to FIG. 11, FIG. 12 is a variation of FIG. 3 showing in detail embodiment 500 introduced above. As such it contains many of the same elements and reference numerals as of FIG. 3. However, as important distinctions over FIG. 3, FIG. 12 shows a detailed view of dynamic encrypted container storage 550 containing an encrypted container storage integration service (ECSIS) or driver 554 and a dynamic encrypted volume manager (DEVM) 556 of the present design.

As a distinction over CSIS 154 of prior embodiments, ECSIS/driver 554 of FIG. 12 includes an encrypt-decrypt kernel module 555 for encrypting and decrypting data as it is read from and written to respectively on the optimally and dynamically/elastically allocated container storage. Further, as a distinction over DVM 156, DEVM 556 is now also responsible for obtaining the encryption key or volume key that is used to encrypt/decrypt dynamically allocated storage volume having a volume id and created over storage devices 160A, 160B, . . . 160N per above teachings. For this purpose, DEVM 556 obtains the encryption key from KMI 560 shown in FIG. 12 and then passes on this encryption key along with the volume id to ECSIS 554. ECSIS 554 then deploys its encrypt-decrypt kernel module 555 utilizing the encryption key obtained from DEVM 556 above to encrypt/decrypt data as it is written/read to/from the newly created logical volume, on an ongoing basis. We may refer to this functionality of ECSIS 554 as marking the container storage for encryption/decryption on an ongoing basis.

Let us now look at flowchart or flow diagram 600 of FIG. 13, in order to understand the encryption capabilities of dynamic encrypted container storage 550 of FIG. 12 of the present embodiments in even greater detail. Flowchart 600 is a variation of flowchart 200 presented and explained earlier in reference to FIG. 5 illustrating the steps required to fulfil a create volume request issued by a container/application. The key differences between flowcharts 200 and 600 are that CSIS 154 and DVM 156 of flowchart 200 have respectively been replaced by ECSIS 554 and DEVM 556 of the present embodiments. The create volume request of the prior teachings now allows a container/application/user to dynamically create an encrypted host/storage volume. There is also an additional step 215 that embodies DEVM 556 obtaining an encryption key from KMI 560, prior to passing it along with the volume id of the new dynamically created storage volume to ECSIS 554 for encryption.

Referring briefly now to FIG. 4 presented earlier, once DEVM 556 has created logical volume 168 having a volume id over volume group 166 per above explanation, it then obtains the encryption key from KMI 560 at step 215 in FIG. 13. Logical volume 168 is the newly provisioned container storage volume or host volume. DEVM then creates the requisite filesystem on volume 168 using techniques known in the art, although this step is not explicitly shown and will be known to skilled artisans. DEVM 556 then passes the encryption key and volume id to ECSIS 554.

From this point forward, all data stored by a container/application on the filesystem on the new encrypted container storage will be encrypted/decrypted data-at-rest in a manner completely transparent to the container and/or a containerized application, and on an ongoing or continual basis. This is because encrypt-decrypt kernel module 555 traps read/write calls and respectively services them by performing decryption/encryption operations of data written/read to/from the new dynamically provisioned encrypted container storage volume. As already noted, module 555 performs the above encryption/decryption operations using the encryption key passed to it by DEVM 556 and which in turn had obtained the key from KMI 560.

Encrypt-decrypt kernel module 555 of ECIS 554 performs encryption or ciphering using techniques known in the art. The instant design is agnostic of the many different types of encryption regimes available in the art. In the preferred embodiment, kernel module 555 employs symmetric encryption. In the same or related embodiment, it uses AES-256 bits XTS-XEX-based tweaked-codebook mode with ciphertext stealing (IEEE Std 1619-2007) block-cipher standard for ciphering. In alternative embodiments, module 555 uses public key infrastructure (PKI) based encryption or asymmetric encryption.

In the embodiments employing symmetric encryption, DEVM 556 interacts with KMI 560 to perform key exchange operations as needed and by utilizing an appropriate key exchange protocol. In other words, DEVM 556 would request an encryption key from KMI 560. KMI is preferably responsible for the management and lifecycle of all encryption keys for dynamic encrypted container storage 550. In alternative embodiments, DEVM 556 may generate the encryption key itself and then send it to the KMI for storage. KMI 560 comprises one or more modules. In the preferred embodiment, KMI 560 is a key manager or key server. Preferably, DEVM 556 communicates with KMI 560 to obtain the encryption key using key management interoperability protocol (KMIP). In another embodiment, KMI 560 implements public-key cryptography standards (PKCS) #11. In the same or a related variation, the KMI is also backed by a hardware security module (HSM), which may be a hardened hardware-based device or software-based (soft-HSM).

It should be noted that dynamic encrypted container storage 550 of the present embodiments subsumes the functionality of dynamic container storage 150 described earlier. In other words, dynamic encrypted container storage 550 may be asked by a container/application for a non-encrypted container storage of the prior embodiments also. In this scenario prior teachings in reference to FIG. 2-10 will apply and operation will proceed per prior explanation. More specifically, operation will proceed as per flowchart 200 of FIG. 5 without the additional step 215 of flowchart 600 of FIG. 13. In other words, our ECSIS 554 and DEVM 556 would act exactly like CSIS 154 and DVM 156 taught above to provided a dynamically/elastically allocated non-encrypted container storage per above teachings.

But in addition, DEVM 556 may also be asked to provide an encrypted container storage for a container or a containerized application. DEVM 556 accomplishes this per present teachings in reference to FIG. 11-14 provided herein. The distinction between a request for a non-encrypted versus an encrypted container storage to dynamic encrypted container storage 550 may be made be an appropriate parameter or flag to the create volume request. Thus, in a single implementation of dynamic encrypted container storage 550 with its ECSIS 554 and DEVM 556 of the present embodiments, dynamically allocated un-encrypted as well as encrypted container storage may be provided to containerized applications according to the present design.

In a similar fashion as flowchart 600 of FIG. 13, FIG. 14 illustrates flowchart 700 as a variation of flowchart 300 of FIG. 7 presented earlier illustrating the steps for carrying out a delete volume request of the above teachings. The key differences between flowcharts 300 and 700 is that flowchart 700 shows ECSIS 554 and DEVM 556 instead of CSIS 554 and DVM 156 respectively of the prior embodiments. Moreover, there is an additional step/box 317 as shown. Step/box 317 signifies that after DEVM 556 deletes the logical volume and the volume group over the partitions in optimal list 236 at step 316, it now instructs KMI 560 to change the state of the encryption key that was used to encrypt the deleted volume to "deleted" or "destroyed" or "retired". This is because the encryption key is no longer needed as the logical volume has been deleted. This step is important because it allows dynamic encrypted container storage 550 to thus effectively perform a "secure erase" of the data. In other words, there is no longer the need to wipe out the disk partitions which can be time-consuming, or be concerned that portions of data on the partitions might be recoverable later.

As noted above, DEVM of dynamic encrypted container storage 550 of the present embodiments is able to provide both unencrypted storage as DVM 156 of dynamic container storage 150 of the prior embodiments, as well as encrypted container storage of the present embodiments. Hence, when DEVM 556 is being used by encrypted container storage 550 to provide unencrypted container storage as DVM 156, step 317 in flowchart 700 for deleting an unencrypted container storage volume is omitted.

All the relevant teachings of the dynamic (unencrypted/non-encrypted) container storage of the prior embodiments, including the functionality of SAM 158 for determining an optimal list of partitions for the new storage volume, apply to the present embodiments of dynamic encrypted container storage also.

Dedicated Dynamic Encrypted Container Storage

In another set of highly preferred embodiments, the dynamic encrypted container storage of the prior teachings provides encrypted container storage volumes to a container(s)/application on a dedicated basis. What this means is that an encrypted storage volume that is dynamically created or mounted (if it had already existed) for a given container(s)/application per above, can be decrypted by only those container(s)/application, and no other container(s)/application. Therefore, these embodiments provide a mechanism for cryptographically tying the encryption key of a volume to the container requesting to use it. Only those containers that are properly "authorized" to use the encrypted volume are able to do so. As a result, the present embodiments are able to provide access of encrypted storage volumes to container(s) on a "dedicated" basis.

To understand the design of the dedicated dynamic encrypted container storage of the present embodiments, let us take advantage of FIG. 15. FIG. 15 illustrates a set of embodiments 800 that are a variation of embodiment(s) 500 of FIG. 12 but with many important distinctions. These include a dedicated dynamic encrypted container storage 850 that expands upon the capabilities of encrypted container storage 550 of FIG. 12 of the prior embodiments. These also include a key management infrastructure (KMI) 860 that expands upon KMI 560 and a dynamic encrypted volume manager (DEVM) 856 that expands upon DEVM 556 presented above. Among other additional features, DEVM 856 now implements a hash-based key derivation function (HKDF) 857 as will be further explained below. Embodiments 800 also show a container manager/engine 808 managing various containers represented by reference numerals 820-828, . . . executing container applications/services 11-13, . . . as shown.

To understand the working of a create volume request for a dedicated volume of the present embodiments, let us take advantage of flowchart 900 of FIG. 16. Flowchart 900 is similar to flowchart 600 of FIG. 13 aside from several important distinctions. More specifically, it is container engine 808 of FIG. 15 rather than container engine 108 of FIG. 13 that now receives the initial create volume request. In the present embodiments, the create volume request includes an encryption flag instructing dedicated dynamic container storage 850 of FIG. 15 that an encrypted container storage volume needs to be created per above.

The create volume request of the present embodiments now also includes a volume secret, or simply a secret. This secret will be used to derive the ultimate encryption key or volume key with which dedicated dynamic volume will be encrypted/decrypted per below explanation. A secret is a piece of data that must only be known to the container or application requesting to create the dedicated encrypted container storage volume. If the storage volume is to be shared between a set of containers then the volume secret also needs to be shared amongst them. In a Docker™ containerized environment, the volume encryption secret may be stored as a Docker™ Secret.

Alternatively, it is stored as a Kubernetes™ secret. In such a variation, Kubernetes may be deployed as a container management system for Docker containers. In yet other implementations, the secret may be implemented using an alternate scheme. In some embodiments, the secret can be stored in the filesystem of the requesting container(s). In other words, the secret may be stored as a part of the container image. Any container instantiated from the container image would thus have access to the secret. If more than one containers are instantiated from the same image, then they have access to the volume secret and are thus able to share the encrypted storage volume. Therefore, in the present embodiments when a predefined set of containers need to access the same dedicated dynamic encrypted container storage volume, they are instantiated from a container image that stores/contains the volume secret for the volume.

In other related embodiments, the volume secret is stored in a secure and dedicated Secrets Storage that is looked up or queried using a secret id/tag/tagName. An exemplary implementation of such a Secrets Storage may take the form a dedicated Key Server or a dedicated Secrets Server separate from KMI 860. In such a scheme, the container image only holds the secret id or secret tag. The secret id/tag/tagName is stored in the container's filesystem as in the above scheme. However, the present embodiments do not store the actual secret in the image and thus may be more secure. When the container needs to obtain the volume secret, it queries the Secrets Storage with the secret id or tag or tagName. The Secrets Storage then responds to the container with the volume secret.

In related variations of the present embodiments, rather than storing the volume secret or secret tag in the container image, the secret or tag is added to the container after its instantiation or at runtime. In such variations, when containers instantiated from container images do not share the same volume secret or secret tag but still need to share the encrypted volume, an alternate scheme for sharing the volume secret or tag at runtime must be provided. In various implementations of the present variations, such a scheme may be implemented as a Docker™ Secret or a Kubernetes™ Secret.

A Kubernetes container management system may be used to manage Docker containers as already noted above. In such implementations, a Kubernetes ConfigMap is used to configure containers managed by Kubernetes. In a preferred approach, the volume secret or secret tag is thus contained within the ConfigMap. Therefore, any containers configured from the same ConfigMap have access to the same volume secret or tag and are thus able to share a dedicated encrypted volume.

Of course, it is possible that a given container requires more than one dedicated volume, or a given set of containers require more than one shared dedicated encrypted volume. This is accomplished by each dedicated volume having its own volume secret. The volume secret is stored/accessible to the container or is shared between the containers using one of the many techniques for implementing the volume secret provided above.

Armed with the knowledge of a implementing a volume secret or simply secret using one or more of a variety of schemes, let us now turn our attention back to flowchart 900 of FIG. 16 for creating a dedicated dynamic encrypted container storage volume according to the present design. Recall from above that container engine 808 of FIG. 15 receives the initial create volume request containing an encryption flag and a secret for the encrypted volume. This is shown by process block/box 901.

The rest of the processing now continues as it would in flowchart 600 of FIG. 13 up until step 915 that replaces step 215 of flowchart 600 as shown. At step 915, DEVM 856 obtains a pre-key from KMI 860 of FIG. 15. DEVM first authenticates itself to KMI 860 by using an appropriate authentication mechanism such as a TLS certificate that may be IP-address based, although this authentication step is not explicitly shown in flowcharts 900 and 600.

The pre-key may be based on any suitable key generation technology used by KMI 860. It may be the same key generation technology as is used for the encryption key of step 215 of flowchart 600, except that instead of using it directly to encrypt/decrypt the newly created storage volume, it is now combined by DEVM 856 with the volume secret as described herein. Regardless, the pre-key is dedicated by KMI 860 to the specific encrypted storage volume being created. In other words, the same pre-key is not used for more than one storage volumes.

In order obtain the pre-key for a newly created volume from KMI 860, DEVM 856 would request KMI 860 to either generate a new key or to assign a previously generated but unassigned pre-key to the new volume. From here onwards, KMI 860 would associate that pre-key to the new volume and store that assignment in its key management database, which may be backed by an HSM per above. Any subsequent requests for mounting/unmounting the volume would now require querying KMI 860 with the volume id of an existing volume, in response to which, KMI 860 would look up and provide the pre-key for the existing volume in its database.

KMI 860 may generate a new key for this purpose or use a previously generated and stored key. The keys may be stored in an HSM as in prior embodiments. Regardless, DEVM 856 now applies a suitable hash-based key derivation function (HKDF) represented by oval 857 in FIG. 15, on the pre-key obtained from KMI 860 and the volume secret implemented and obtained using one of the many suitable schemes described above, to derive an encryption key or volume key. This operation is represented by the following equation:

$$\text{Volume key} = HKDF(\text{volume secret}, \text{pre-key}) \quad \text{Eq. 1}$$

In the above equation, HKDF 857 is a KDF based on a hash message authentication code (HMAC), referred to as HMAC-based KDF per the prevailing techniques, and pre-key is the salt for the HKDF. The HKDF may preferably be based on NIST SP800-56C standard or alternatively implemented on another similar suitable key derivation function available in the art.

Since HKDF cannot be reversed, as a key advantage of the present design, both the pre-key and volume secret are required to obtain the volume key. In other words, both KMI 860 as well as container manager 808 have control over the ultimate volume key. Let us now understand this advantage of the present design further. KMI 860 and relatedly a central administrator has control over the volume key because it/admin can deactivate it by retiring the pre-key when needed. Alternatively, it can revoke the client TLS certificate of DEVM 856 that is used by the DEVM to authenticate to KMI 860 per above. Alternatively, or in addition, it may revoke the TLS certificate of the requesting container(s) of the create volume request. The containers may ultimately be operating in a virtual machine (VM) which authenticates to the KMI. Thus, in other preferred embodiments, containers 820-828 of FIG. 15 and/or the VM (not shown in FIG. 15) are required to authenticate to KMI 860. The authentication may be based on an appropriate authentication mechanism, such as TLS certificates that may be based on the IP-addresses of the containers/VM.

In addition to the control of KMI 860 over the volume key per above, containers 820, 822, . . . , container manager/engine 808 and the associated containerization software/solution/suite also has control over the volume key. This is because the volume secret is also required in Eq. 1 above to access the ultimate volume key required to encrypt/decrypt an encrypted storage volume. As already explained, the volume secret is in the custody of containers 820, 822, . . . via one of the many volume secret implementation schemes provided above. As already noted, various implementations of the present technology provide for container manager/engine 808 to be a Docker™ daemon, or a Kubernetes™ container management layer 808 managing containers 820, 822, . . . that may be docker or any other suitable containers.

Let us now get back to step 915 of flowchart 900 of FIG. 16. Per above, DEVM 856 derives the encryption key or volume key using Eq. 1 above. In a variation, the key derived by the DEVM using Eq. 1 is not used as the ultimate volume key, but is used as a wrapping key for the ultimate volume key. In other words, the encryption key derived by Eq. 1 above is used to encrypt and decrypt the ultimate volume key. In such an embodiment, the key thus obtained after the second encryption operation is used as the volume key. This second encryption operation may be performed by DEVM itself or alternatively in another lower-level module operating closer to the filesystem of the encrypted volume.

Regardless, the rest of the processing now continues as per flowchart 600 of FIG. 13. In other words, at step/box 218 DEVM 856 passes the volume id of the newly created volume (from step 214), along with the volume key (from step/box 915) to ECSIS 554. ECSIS or driver 554 now marks the encrypted volume for encryption/decryption by deploying its encrypt-decrypt kernel module 555 for transparent and ongoing encryption/decryption of all data at rest on the volume. It then passes the volume id to container manager/engine 808 per step/box 220.

According the dedicated dynamic encrypted container storage design of the present embodiments, from here onwards, only those containers/application will be able to mount this volume that have access to and provide the requisite volume secret as a part of the mount volume request. As in prior embodiments, it is possible that the create volume request described above also automatically mounts the newly created volume for the requesting containers, although this is not explicitly shown in flowchart 900. The instant design thus provides the volume secret as a mechanism of cryptographically tying the encryption/volume key of the volume to the container requesting to create/mount it.

Let us now take a look at the explicit steps required to mount or attach an existing dedicated encrypted container storage of the present embodiments. For this purpose, let us take a look at flowchart 950 of FIG. 17. Unsurprisingly, it is reminiscent of flowchart 900 presented earlier, except that steps/boxes associated with volume creation are no longer required. More specifically, container manager/engine 808 receives a request to mount an existing dedicated encrypted volume from a container, such as containers 820-828 of FIG. 15. This is shown by box/step 952.

Such a request must accompany the volume id of the encrypted volume, as well as the volume secret. The container must have access to the volume secret in order to accomplish this request. The volume secret is implemented using one of a variety of schemes described earlier. Container Manager/Engine 808 now passes this request to ECSIS/driver 554 per step/box 954, which passes it to DEVM 856, per step/box 956.

As shown by step/box 958, DEVM 856 queries KMI 860 with the volume id to obtain the pre-key for the volume per above. It then uses HKDF 857 in Eq. 1 above to derive the volume key. If the volume key is wrapped, it first unwraps/decrypts the volume key. It then passes the volume id and the ultimate volume key to ECSIS/driver 554 per step/box 960. ECSIS 554 now deploys encrypt-decrypt kernel module 555 per above, mounts the volume with requested volume id and then notifies container engine 808 that the request has been completed. This is shown by box/step 962. Of course, if a container issues requests to mount multiple encrypted storage volumes, each such request must also contain the volume secret for the corresponding encrypted volume.

As will be apparent from above, only those containers can accomplish the mount volume request of flowchart 950, that have access to and provide the corresponding volume secret for the volume as a part of the mount request. As already noted, the design thus cryptographically ties the volume key to the container by using the volume secret as an underlying mechanism in addition to the pre-key for deriving the ultimate volume key. This is a key advantage of dedicated dynamic encrypted container 850 of the present design.

To continue completing our understanding of the present embodiments, let us now look at the steps required to carry out a delete volume request of dedicated dynamic encrypted container storage 850. The steps for this purpose are provided explicitly in flowchart 975 of FIG. 18 for the preferred embodiment. It is to be noted that except for step 317 and the fact that the present embodiments utilize container engine 808, DEVM 856 and KMI 860 which are the expanded counterparts of container engine 108, DEVM 556 and KMI 560 of the prior embodiments, the steps for deleting an existing dedicated encrypted container storage volume are the same as those already described above in reference to flowchart/flow diagram 700 of FIG. 14.

Step 317 of flowchart 700 has been replaced by step/box 977 in flowchart 975 of FIG. 18. Per step/box 977 of flowchart 975, DEVM 856 now instructs KMI 860 to change the state of the pre-key for the volume to "destroyed" or "deleted" or "retired", rather than the ultimate volume/encryption key as in flowchart 700. The rest of the processing before and after this step remains the same as in flowchart 700.

In a variation of this preferred embodiment, the container/application generating a delete volume request must also prove that it has the corresponding volume secret. In such a variation, DEVM 856 must first ensure that the volume key for the volume matches the volume by obtaining the pre-key for the volume from KMI 856 to derive the volume key using Eq. 1 above. It then ensures that the volume key matches the volume using an appropriate cryptographic technique available in the art, before deleting the volume. The steps for this process are explicitly shown in flowchart 980 of FIG. 19. Flowchart 980 is a variation of flowchart 975 with the only difference of step 982 replacing step 316 of flowchart 975. Per step/box 982, DEVM 856 first derives the volume key and matches it to the volume before deleting it per above explanation.

Conversely to flowchart 950 of FIG. 17, FIG. 20 provides the explicit steps in flowchart 990 required to unmount/unattach an existing dedicated encrypted container storage of the present embodiments. These steps are the same as unmounting container storage volumes of the prior embodiments, except of course utilizing container manager 808 of the present embodiments. The process begins with a container/application requesting to unmount a volume with a volume id. Container engine/manager 992 receives the request per step/box 992. It then passes the unmount request to ECSIS/driver 554 pre step 994. ECSIS/driver 554 then unmounts the volume and notifies container engine 808 that the request has been satisfied. This is shown by box/step 996.

All the relevant teachings of the dynamic encrypted container storage of the prior embodiments, including the functionality of SAM 158 for determining an optimal list of partitions for the new storage volume, etc. apply to the present embodiments of dedicated dynamic encrypted container storage also.

While the above teachings expand upon the functionality of dynamic/elastic container storage of the prior embodiments, it should be noted that even traditional container storage solutions can benefit from the innovative design of the present embodiments. In other words, the innovative design of combining a pre-key with a volume secret to derive the ultimate volume key may be used to dedicate statically allocated container storage volumes to only those container(s) that have access to the volume secret.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method executing by at least one microprocessor, computer-readable instructions stored in a non-transitory storage medium coupled to said at least one microprocessor, said method comprising the steps of:
    (a) executing a container engine on a host for provisioning and managing one or more containers, at least one of said one or more containers sending a request to said container engine for mounting an encrypted volume, said request accompanied by a volume secret and a volume id corresponding to said encrypted volume;

(b) configuring said container engine to pass said request to a dynamic encrypted volume manager (DEVM) via an encrypted container storage integration service (ECSIS);

(c) configuring said DEVM to obtain a pre-key from a key management infrastructure (KMI) and then to combine said volume secret with said pre-key using a hash-based key derivation function (HKDF), thus obtaining a volume key, and further configuring said DEVM to pass said volume key and said volume id to said ECSIS; and (d) configuring said ECSIS to mark said encrypted volume for decryption via said volume key and mounting said encrypted volume.

2. The method of claim 1 implementing said ECSIS as one of a Docker™ volume driver and a Kubernetes™ container storage interface (CSI).

3. The method of claim 1 basing said HKDF on the NIST SP800-56C standard.

4. The method of claim 1 storing said volume secret in one of a Secrets Storage, a Docker Secret, a Kubernetes ConfigMap and a filesystem of said at least one of said one or more containers sending said request.

5. The method of claim 1, employing an encrypt-decrypt kernel module in said step (d) for said decryption.

6. The method of claim 5, employing symmetric encryption with said encryption key, for said encrypting of said encrypted volume.

7. The method of claim 1, providing said encrypted volume to comprise of partitions from one or more storage devices on one or more of a local storage, a cloud storage, a redundant array of independent disks (RAID), a network attached storage (NAS) and a storage area network (SAN).

8. The method of claim 1, executing on an infrastructure-as-a-service (IaaS).

9. The method of claim 1, authenticating said at least one of said one or more containers to said KMI before said sending of said request.

10. A computer-implemented method executing by at least one microprocessor, computer-readable instructions stored in at least one non-transitory storage medium coupled to said at least one microprocessor, said method comprising the steps of:

(a) executing a container engine on a host, said container engine making a request to create an encrypted storage volume of a required size for one or more containers managed by said container engine, said request accompanied by a volume secret corresponding to said encrypted storage volume;

(b) instructing a storage configuration manager (SCM) to provision one or more storage devices on said host and to partition said one or more storage devices into one or more partitions;

(c) configuring said container engine to pass said request to a storage allocation module (SAM) via an encrypted container storage integration service (ECSIS);

(d) configuring said storage allocation module (SAM) to create a global lock file, and then to read storage allocation persistence (SAP) information from a first partition of each of said of one or more storage devices, and then to create an optimal list of one or more partition ids with corresponding partitions having a total size equal to or exceeding said required size;

(e) configuring a dynamic encrypted volume manager (DEVM) to create a logical volume over said corresponding partitions with partition ids in said optimal list;

(f) further configuring said DEVM to obtain a pre-key from a key management infrastructure (KMI) and then to derive a volume key from said pre-key and said volume secret, and then to pass a volume id of said logical volume along with said volume key to said ECSIS for encrypting said logical volume thus obtaining said encrypted storage volume; and (g) further configuring said ECSIS to pass said volume id to said container engine.

11. A dedicated dynamic encrypted container storage system comprising at least one non-transitory storage medium storing computer-readable instructions and at least one microprocessor coupled to said at least one non-transitory storage medium for executing said computer-readable instructions, said system further comprising:

(a) a container engine executing on a host for provisioning and managing one or more containers wherein at least one of said one or more containers sends a request to mount an encrypted volume, said request accompanied by a volume secret and a volume id corresponding to said encrypted volume; and (b) a dynamic encrypted volume manager (DEVM) that obtains a pre-key from a key management infrastructure (KMI) and combines said volume secret with said pre-key using a hash-based key derivation function (HKDF), thus obtaining a volume key, said DEVM further passing said volume key and said volume id to an encrypted container storage integration service (ECSIS);

wherein said ECSIS deploys an encrypt-decrypt kernel module for decryption of said encrypted volume with said volume key, mounts said encrypted volume and notifies said container engine about completion of said request.

12. The system of claim 11 wherein said DEVM and said ECSIS are implemented as a single module.

13. The system of claim 11 wherein said HKDF is based on the NIST SP800-56C standard.

14. The system of claim 11, wherein said ECSIS is implemented as one of a Docker™ volume driver and a Kubernetes™ container storage interface (CSI).

15. The system of claim 11, wherein said volume secret is stored in one of a Secrets Storage, a Docker Secret, a Kubernetes ConfigMap and a filesystem of said at least one of said one or more containers sending said request.

16. The system of claim 11, wherein a microservices application is executed in a plurality of said one or more containers, and wherein said microservices application persists data in said encrypted volume.

17. The system of claim 11, wherein said encrypt-decrypt module employs Advanced Encryption Standard (AES) 256 bits XTS block-cipher for said decryption of said logical volume in said element (b).

18. The system of claim 11, wherein said encrypted volume comprises of one or more partitions in one or more of a local storage device, a cloud storage, a redundant array of independent disks (RAID), a network attached storage (NAS) and a storage area network (SAN).

19. The system of claim 11, wherein said DEVM authenticates itself to said KMI in said element (b) before said obtaining of said pre-key.

20. The system of claim 11, wherein said at least one of said one or more containers authenticates itself to said KMI.

21. The system of claim 11, wherein said volume key wraps the ultimate volume key for said encrypted volume.

* * * * *